United States Patent
Ording

(10) Patent No.: US 8,839,155 B2
(45) Date of Patent: Sep. 16, 2014

(54) ACCELERATED SCROLLING FOR A MULTIFUNCTION DEVICE

(75) Inventor: Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 325 days.

(21) Appl. No.: 12/566,638

(22) Filed: Sep. 24, 2009

(65) Prior Publication Data
US 2010/0235794 A1    Sep. 16, 2010

Related U.S. Application Data

(60) Provisional application No. 61/160,680, filed on Mar. 16, 2009.

(51) Int. Cl.
G06F 3/033 (2013.01)
G06F 3/01 (2006.01)
G06F 3/048 (2013.01)
G06F 3/0488 (2013.01)
G06F 3/0485 (2013.01)

(52) U.S. Cl.
CPC .......... *G06F 3/04883* (2013.01); *G06F 3/0485* (2013.01)
USPC ............................ 715/863; 715/702; 715/784

(58) Field of Classification Search
USPC ......................................... 715/863, 784, 702
See application file for complete search history.

(56) References Cited

U.S. PATENT DOCUMENTS

| | | |
|---|---|---|
| 4,837,798 A | 6/1989 | Cohen et al. |
| 4,935,954 A | 6/1990 | Thompson et al. |
| 4,972,462 A | 11/1990 | Shibata |
| 5,003,577 A | 3/1991 | Ertz et al. |
| 5,164,982 A | 11/1992 | Davis et al. |
| 5,202,961 A | 4/1993 | Mills et al. |
| 5,283,818 A | 2/1994 | Klausner et al. |

(Continued)

FOREIGN PATENT DOCUMENTS

| | | |
|---|---|---|
| AU | 2008 100011 | 2/2008 |
| CN | 1673939 A | 9/2005 |

(Continued)

OTHER PUBLICATIONS

Ahlberg,C. et al., The Alphaslider: A Compact and Rapid SAhlberg,C. et al., "The Alphaslider: A Compact and Rapid Selector," ACM, Apr. 1994, proceedings of the SIGCHI conference on Human Factors in Computing Systems, pp. 365-371.

(Continued)

*Primary Examiner* — Nicholas Ulrich
(74) *Attorney, Agent, or Firm* — Morrison & Foerster LLP

(57) ABSTRACT

A computer-implemented method is performed at a multifunction device with a display and a touch-sensitive surface. The method includes detecting multiple input gestures by a user, beginning with an initial input gesture. For each input gesture after the initial input gesture, the method scrolls information on the display at a respective scrolling speed. The respective scrolling speed is determined based on the respective input gesture movement speed in the input gesture and a movement multiplier. The method determines whether the respective input gesture meets one or more swipe gesture criteria, and determines whether the respective input gesture meets one or more successive gesture criteria. When the input gesture meets the one or more swipe gesture criteria and the one or more successive gesture criteria, the method updates the movement multiplier in accordance with one or more movement multiplier adjustment criteria.

22 Claims, 20 Drawing Sheets

(56) References Cited

U.S. PATENT DOCUMENTS

| | | |
|---|---|---|
| 5,333,266 A | 7/1994 | Boaz et al. |
| 5,390,236 A | 2/1995 | Klausner et al. |
| 5,453,725 A | 9/1995 | You et al. |
| 5,463,725 A | 10/1995 | Henckel et al. |
| 5,510,808 A | 4/1996 | Cina, Jr. et al. ............... 345/123 |
| 5,524,140 A | 6/1996 | Klausner et al. |
| 5,550,559 A | 8/1996 | Isensee et al. ................ 345/124 |
| 5,559,301 A | 9/1996 | Bryan et al. |
| 5,572,576 A | 11/1996 | Klausner et al. |
| 5,745,716 A | 4/1998 | Tchao et al. ................. 395/350 |
| 5,809,267 A | 9/1998 | Moran et al. |
| 5,825,308 A | 10/1998 | Rosenberg ..................... 341/20 |
| 5,844,547 A | 12/1998 | Minakuchi et al. ........... 345/173 |
| 5,859,638 A | 1/1999 | Coleman et al. .............. 345/341 |
| 5,880,411 A * | 3/1999 | Gillespie et al. ........... 178/18.01 |
| 5,936,623 A | 8/1999 | Amro |
| 5,943,052 A | 8/1999 | Allen et al. |
| 5,973,676 A | 10/1999 | Kawakura |
| 6,073,036 A | 6/2000 | Heikkinen et al. ............ 455/575 |
| 6,278,443 B1 | 8/2001 | Amro et al. ................... 345/173 |
| 6,323,846 B1 | 11/2001 | Westerman et al. .......... 345/173 |
| 6,335,722 B1 | 1/2002 | Tani et al. |
| 6,337,698 B1 | 1/2002 | Keely, Jr. et al. |
| 6,340,979 B1 | 1/2002 | Beaton et al. ................. 345/764 |
| 6,353,442 B1 | 3/2002 | Masui |
| 6,430,574 B1 | 8/2002 | Stead |
| 6,462,752 B1 | 10/2002 | Ma et al. |
| 6,469,695 B1 | 10/2002 | White ............................ 345/173 |
| 6,542,171 B1 | 4/2003 | Satou et al. |
| 6,570,557 B1 | 5/2003 | Westerman et al. .......... 345/173 |
| 6,677,932 B1 | 1/2004 | Westerman ................... 345/173 |
| 6,690,387 B2 | 2/2004 | Zimmerman et al. |
| 6,788,292 B1 | 9/2004 | Nako et al. |
| 6,865,718 B2 * | 3/2005 | Levi Montalcini ........... 715/786 |
| 6,954,899 B1 | 10/2005 | Anderson ..................... 715/701 |
| 6,966,037 B2 | 11/2005 | Fredriksson et al. ......... 715/830 |
| 7,007,239 B1 | 2/2006 | Hawkins et al. |
| 7,054,965 B2 | 5/2006 | Bell et al. ........................ 710/72 |
| 7,082,163 B2 | 7/2006 | Uenoyama et al. ....... 375/240.12 |
| 7,152,210 B1 | 12/2006 | Van Den Hoven et al. ... 715/723 |
| 7,173,637 B1 * | 2/2007 | Hinckley et al. .............. 345/684 |
| 7,312,790 B2 | 12/2007 | Sato et al. ...................... 345/173 |
| 7,404,152 B2 | 7/2008 | Zinn et al. ..................... 715/864 |
| 7,408,538 B2 | 8/2008 | Hinckley et al. |
| 7,436,395 B2 | 10/2008 | Chiu et al. ..................... 345/173 |
| 7,479,949 B2 | 1/2009 | Jobs et al. ...................... 345/173 |
| 7,786,975 B2 * | 8/2010 | Ording et al. ................. 345/156 |
| 7,822,443 B2 | 10/2010 | Kim et al. |
| 7,996,792 B2 | 8/2011 | Anzures et al. |
| 8,032,298 B2 * | 10/2011 | Han ............................... 701/455 |
| 2002/0015024 A1 | 2/2002 | Westerman et al. .......... 345/173 |
| 2002/0030667 A1 | 3/2002 | Hinckley et al. |
| 2002/0080151 A1 | 6/2002 | Venolia |
| 2002/0122066 A1 | 9/2002 | Bates et al. |
| 2002/0130891 A1 | 9/2002 | Singer |
| 2002/0135602 A1 | 9/2002 | Davis et al. |
| 2002/0143741 A1 | 10/2002 | Laiho et al. ........................ 707/1 |
| 2002/0154173 A1 | 10/2002 | Etgen et al. |
| 2002/0186252 A1 | 12/2002 | Himmel et al. ............... 345/787 |
| 2002/0191029 A1 | 12/2002 | Gillespie et al. |
| 2002/0196238 A1 | 12/2002 | Tsukada et al. |
| 2003/0008679 A1 | 1/2003 | Iwata et al. .................... 455/556 |
| 2003/0076301 A1 * | 4/2003 | Tsuk et al. ..................... 345/159 |
| 2003/0076306 A1 | 4/2003 | Zadesky et al. ............... 345/173 |
| 2003/0122787 A1 * | 7/2003 | Zimmerman et al. ........ 345/173 |
| 2003/0128192 A1 * | 7/2003 | van Os .......................... 345/173 |
| 2003/0131317 A1 | 7/2003 | Budka et al. ................... 715/514 |
| 2003/0226152 A1 | 12/2003 | Billmaier et al. .............. 725/135 |
| 2004/0100479 A1 | 5/2004 | Nakano et al. ................ 345/700 |
| 2004/0143796 A1 | 7/2004 | Lerner et al. |
| 2004/0252109 A1 | 12/2004 | Trent, Jr. et al. .............. 345/174 |
| 2005/0012723 A1 | 1/2005 | Pallakoff ....................... 345/173 |
| 2005/0024345 A1 | 2/2005 | Eastty et al. |
| 2005/0071437 A1 | 3/2005 | Bear et al. |
| 2005/0177445 A1 | 8/2005 | Church |
| 2005/0210403 A1 | 9/2005 | Satanek ......................... 715/786 |
| 2006/0007174 A1 | 1/2006 | Shen |
| 2006/0010400 A1 | 1/2006 | Dehlin et al. |
| 2006/0015819 A1 | 1/2006 | Hawkins et al. |
| 2006/0018446 A1 | 1/2006 | Schmandt et al. |
| 2006/0026521 A1 | 2/2006 | Hotelling et al. ............. 715/702 |
| 2006/0026535 A1 | 2/2006 | Hotelling et al. ............. 715/863 |
| 2006/0026536 A1 | 2/2006 | Hotelling et al. ............. 715/863 |
| 2006/0038796 A1 | 2/2006 | Hinckley et al. |
| 2006/0184901 A1 | 8/2006 | Dietz ............................. 715/855 |
| 2006/0234680 A1 | 10/2006 | Doulton |
| 2006/0236262 A1 | 10/2006 | Bathiche et al. |
| 2006/0239419 A1 | 10/2006 | Joseph et al. |
| 2006/0253547 A1 | 11/2006 | Wood et al. ................... 709/217 |
| 2006/0268020 A1 | 11/2006 | Han |
| 2007/0002018 A1 * | 1/2007 | Mori ............................. 345/158 |
| 2007/0080936 A1 * | 4/2007 | Tsuk et al. ..................... 345/156 |
| 2007/0132789 A1 | 6/2007 | Ording et al. ................. 345/684 |
| 2007/0146337 A1 * | 6/2007 | Ording et al. ................. 345/173 |
| 2007/0150830 A1 | 6/2007 | Ording et al. ................. 715/784 |
| 2007/0192744 A1 | 8/2007 | Reponen |
| 2007/0198111 A1 | 8/2007 | Oetzel et al. |
| 2008/0027637 A1 | 1/2008 | Sakano |
| 2008/0042984 A1 | 2/2008 | Lim et al. |
| 2008/0055257 A1 | 3/2008 | Peng |
| 2008/0055264 A1 | 3/2008 | Anzures et al. |
| 2008/0056459 A1 | 3/2008 | Vallier et al. |
| 2008/0155417 A1 | 6/2008 | Vallone et al. |
| 2008/0163131 A1 | 7/2008 | Hirai et al. |
| 2008/0165141 A1 | 7/2008 | Christie |
| 2008/0168395 A1 | 7/2008 | Ording et al. |
| 2008/0207176 A1 | 8/2008 | Brackbill et al. |
| 2008/0211785 A1 | 9/2008 | Hotelling et al. |
| 2008/0259040 A1 | 10/2008 | Ording et al. |
| 2008/0320391 A1 | 12/2008 | Lemay et al. |
| 2009/0006958 A1 | 1/2009 | Pohjola et al. |
| 2009/0075694 A1 | 3/2009 | Kim et al. |
| 2009/0158149 A1 | 6/2009 | Ko |
| 2009/0160804 A1 | 6/2009 | Chang et al. |
| 2009/0174667 A1 | 7/2009 | Kocienda et al. |
| 2009/0178008 A1 | 7/2009 | Herz et al. |
| 2009/0199119 A1 | 8/2009 | Park et al. |
| 2010/0013782 A1 | 1/2010 | Liu et al. |
| 2010/0058228 A1 | 3/2010 | Park |
| 2010/0134425 A1 * | 6/2010 | Storrusten ..................... 345/173 |
| 2010/0162181 A1 * | 6/2010 | Shiplacoff et al. ............ 715/863 |
| 2010/0175018 A1 | 7/2010 | Petschnigg et al. |
| 2010/0231534 A1 | 9/2010 | Chaudhri et al. |
| 2011/0050594 A1 | 3/2011 | Kim et al. |
| 2011/0074699 A1 | 3/2011 | Marr et al. |
| 2011/0163967 A1 | 7/2011 | Chaudhri |

FOREIGN PATENT DOCUMENTS

| | | | |
|---|---|---|---|
| DE | 196 21 593 A1 | 12/1997 | ............ G06F 17/30 |
| DE | 298 24 936 U1 | 8/2003 | ................ G06F 1/16 |
| DE | 10 2004 029 203 | 12/2005 | |
| EP | 0 679 005 A1 | 10/1995 | |
| EP | 0 684 543 A1 | 11/1995 | |
| EP | 0 795 811 A1 | 9/1997 | |
| EP | 0 994 409 A2 | 10/1999 | ............. G06F 3/033 |
| EP | 0 961 199 A1 | 12/1999 | |
| EP | 1 058 181 A1 | 12/2000 | |
| EP | 1 615 109 A2 | 1/2006 | |
| EP | 1 942 401 A1 | 7/2008 | |
| KR | 2002-0069952 A | 9/2005 | |
| WO | WO 93/20640 | 10/1993 | |
| WO | WO 94/17469 | 8/1994 | ............. G06F 3/033 |
| WO | WO 99/16181 | 4/1999 | |
| WO | WO 00/63766 A1 | 10/2000 | |
| WO | WO 01/02949 A1 | 1/2001 | |
| WO | WO 01/29702 A2 | 4/2001 | ............. G06F 17/30 |
| WO | WO 2004/111816 A2 | 12/2004 | |
| WO | WO 2005/010725 A2 | 2/2005 | |

(56) References Cited

FOREIGN PATENT DOCUMENTS

| WO | WO 2006/020304 A2 | 2/2006 |
|---|---|---|
| WO | WO 2006/020305 A2 | 2/2006 |

OTHER PUBLICATIONS

Bederson, B, "Fisheye Menus," Human-Computer Interaction Lab, Institute for Advanced Computer Studies, Computer Science Department, University of Maryland, College Park, ACM 2000, 9 pages.
Esato, "A Couple of My Mates. Meet JasJar and K-Jam (Many Pics)," 90 pages, Apr. 13, 2006.
Hinckley et al., "Quantitative Analysis of Scrolling Techniques," CHI 2002 Conf. on Human Factors in Computing Systems, pp. 65-72 (CHI Letters, vol. 4, No. 1), 2002.
Miller, D., "Personal/Java Application Environment," Jun. 8, 1999, 12 pages. http://java.sun.com/products/personaljava/touchable.
Potala Software, "Potala Telly," Oct. 19, 2005, pp. 1-6, http://web.archive.org/web/20051019000340/www.potatasoftware.com/telly.aspx.
Ramos, G., "Zliding: Fluid Zooming and Sliding for High Precision Parameter Manipulation," Oct. 2005, Proceedings of the 18th annual ACM Symposium on User Interface Software and Technology, pp. 143-152.
Rekimoto, J, "SmartSkin: An Infrastructure for Freehand Manipulation on Interactive Surfaces," CHI 2002, Apr. 20-25, 2002, 8 pages.
Smith, R., "Sygic. Mobile Contacts," Sep. 2, 2004, 13 pages, http://www.pocketnow.com/index.php?a=portal_detail&id=467.
International Search Report and Written Opinion dated Nov. 22, 2007, received in International Application No. PCT/US2006/061333, which corresponds to U.S. Appl. No. 11/322,551.
International Search Report and Written Opinion dated Feb. 15, 2008, received in International Application No. PCT/US2006/061337, which corresponds to U.S. Appl. No. 11/322,553.
European Search Report dated Sep. 2, 2009, received in European Application No. 09162953.5-1527, which corresponds to U.S. Appl. No. 11/322,553.
International Search Report dated Apr. 26, 2007, received in International Application No. PCT/US2006/061627, which corresponds to U.S. Appl. No. 11/322,547.
Office Action dated Dec. 18, 2008, received in U.S. Appl. No. 11/322,551.
Office Action dated Jun. 15, 2009, received in U.S. Appl. No. 11/322,551.
Office Action dated Sep. 22, 2009, received in U.S. Appl. No. 11/322,551.
Office Action dated Mar. 12, 2010, received in U.S. Appl. No. 11/322,551.
Notice of Allowance dated Jul. 21, 2010, received in U.S. Appl. No. 11/322,551.
Office Action dated Jun. 15, 2007, received in U.S. Appl. No. 11/322,553.
Office Action dated Feb. 5, 2008, received in U.S. Appl. No. 11/322,553.
Office Action dated Aug. 5, 2008, received in U.S. Appl. No. 11/322,553.
Office Action dated Dec. 26, 2008, received in U.S. Appl. No. 11/322,553.
Office Action dated Jun. 17, 2009, received in U.S. Appl. No. 11/322,553.
Office Action dated Apr. 5, 2010, received in U.S. Appl. No. 11/322,553.
Office Action dated Sep. 1, 2009, received in Australian patent application No. 2006321681, which corresponds to U.S. Appl. No. 11/322,553.
Office Action dated Dec. 23, 2009, received in Australian patent application No. 2006321681, which corresponds to U.S. Appl. No. 11/322,553.
Office Action dated Jan. 8, 2010, received in Chinese Patent Application No. 200680052109.3, which corresponds to U.S. Appl. No. 11/322,553.
Office Action dated Sep. 8, 2009, received in German patent application No. 11 2006 003 309.3-53 which corresponds to U.S. Appl. No. 11/322,553.
Office Action dated Sep. 2, 2009, issued in European Application No. 09162953.5, which corresponds to U.S. Appl. No. 11/322,553.
Office Action dated May 31, 2010, received in Korean Application No. 10-2008-7016570, which corresponds to U.S. Appl. No. 11/322,553, 5 pages.
Office Action dated Oct. 30, 2007 received in U.S. Appl. No. 11/322,547.
Office Action dated Jun. 9, 2008, received in U.S. Appl. No. 11/322,547.
Office Action dated Aug. 22, 2008, received in U.S. Appl. No. 11/322,547.
Office Action dated Feb. 5, 2009, received in U.S. Appl. No. 11/322,547.
Office Action dated Aug. 6, 2009, received in U.S. Appl. No. 11/322,547.
Final Office Action dated May 28, 2010, received in U.S. Appl. No. 11/322,547.
Notice of Allowance dated Aug. 6, 2010, received in U.S. Appl. No. 11/322,547.
Office Action dated Jan. 8, 2010, received in Chinese Patent Application No. 200680052778.0, which corresponds to U.S. Appl. No. 11/322,547.
Office Action dated Aug. 11, 2010, received in Chinese Application No. 200680052778.0, which corresponds to U.S. Appl. No. 11/322,547.
Office Action dated Oct. 14, 2009, received in German Patent Application No. A116012WODE, which corresponds to U.S. Appl. No. 11/322,547.
Office Action dated Apr. 21, 2009, received in the European Patent Application which corresponds to U.S. Appl. No. 11/322,547.
Office Action dated May 31, 2010, received in Korean Patent Application No. 10-2008-7017977, which corresponds to U.S. Appl. No. 11/322,547.
Notice of Allowance dated Oct. 19, 2012, received in U.S. Appl. No. 12/240,974, 13 pages (Gehani).
Office Action dated Oct. 22, 2012, received in U.S. Appl. No. 12/567,717, 17 pages (Marr).
Office Action dated Sep. 27, 2012, received in U.S. Appl. No. 12/788,279, 28 pages (Chaudhri).
Arons, B., "The Audio-Graphical Interface to a Personal Integrated Telecommunications System," Massachusetts Institute of Technology, Department of Architecture Master Thesis, Jun. 1984, 88 pages.
Coleman, D., "Meridian Mail Voice Mail System Integrates Voice Processing and Personal Computing," Speech Technology, vol. 4, No. 2, Mar./Apr. 1988, 7 pages.
Microsoft Corporation, Microsoft Office Word 2003 (SP2), 1983-2003, Microsoft Corporation, SP3 as of 2005, 5 pages MSWord 2003 Figures 1-5.
Microsoft Word 2000 (9.0.2720), 1999, Microsoft Corporation, 5 Pages MSWord figures 1-5.
Myers, B., "Shortcutter for Palm," The Pittsburgh Pebbles PDA Project, printed Dec. 19, 2006, 11 pages, http://www.cs.cmu.edu/~pebbles/v5/shortcutter/palm/index.html.
Northern Telecom. "Meridian Mail PC User Guide." 17 pages.
Schmandt, C. et al., "A Conversational Telephone Messaging System," IEEE Transactions on Consumer Electronics, Aug. 1984, vol. CE-30, 4 pages.
Schmandt, C. et al., "Phone Slave: A Graphical Telecommunications Interface," Proceeding of the SID, vol. 26/1, 1985, 4 pages.
Schmandt, C. et al., "Phone Slave: A Graphical Telecommunications Interface," Society for Information Display, 1984 International Symposium Digest of Technical Papers, Jun. 1984, San Francisco, CA, 4 pages.
International Search Report and Written Opinion dated Feb. 21, 2008, received in International Application No. PCT/US2007/077443, which corresponds to U.S. Appl. No. 11/770,720, 11 pages (Anzures).
International Search Report and Written Opinion dated Jul. 4, 2008, received in International Application No. PCT/US2008/050083, which corresponds to U.S. Appl. No. 11/968,064, 14 pages (Ording).

(56) References Cited

OTHER PUBLICATIONS

International Search Report and Written Opinion dated Jun. 18, 2010, received in International Application No. PCT/US2010/027088, which corresponds to U.S. Appl. No. 12/566,669, 13 pages (Chaudhri).
Office Action dated Jan. 4, 2011, received in U.S. Appl. No. 11/770,720, 18 pages (Anzures).
Notice of Allowance dated May 20, 2011, received in U.S. Appl. No. 11/770,720, 8 pages (Anzures).
Office Action dated Feb. 17, 2010, received in Australian Patent Application No. 2007292473, which corresponds to U.S. Appl. No. 11/770,720, 1 page (Anzures).
Office Action dated Oct. 25, 2010, received in Chinese Patent Application No. 200780040362.1, which corresponds to U.S. Appl. No. 11/770,720, 18 pages (Anzures).
Office Action dated Jul. 21, 2011, received in Chinese Patent Application No. 200780040362.1, which corresponds to U.S. Appl. No. 11/770,720, 19 pages (Anzures).
Office Action dated Jun. 7, 2010, received in German Patent Application No. 11 2007 002 090.3-53, which corresponds to U.S. Appl. No. 11/770,720, 8 pages (Anzures).
Office Action dated Feb. 24, 2010, received in European Patent Application No. 07 814 635.4-2212, which corresponds to U.S. Appl. No. 11/770,720, 4 pages (Anzures).
Summons to attend oral proceedings dated Nov. 24, 2010 received in European Patent Application No. 07 814 635.4, which corresponds to U.S. Appl. No. 11/770,720, 5 pages (Anzures).
Decision to Grant dated Nov. 4, 2011, received in European Patent Application No. 2 069 895, which corresponds to U.S. Appl. No. 11/770,720, 1 page (Anzures).
Office Action dated Jun. 6, 2011, received in Japanese Patent Application No. 2009 527504, which corresponds to U.S. Appl. No. 11/770,720, 4 pages (Anzures).
Office Action dated Feb. 15, 2011, received in Korean Patent Application No. 10-2009-7007062, which corresponds to U.S. Appl. No. 11/770,720, 3 pages (Anzures).
Office Action dated May 15, 2009, received in U.S. Appl. No. 11/968,064, 20 pages (Ording).
Final Office dated Jan. 5, 2010, received in U.S. Appl. No. 11/968,064, 20 pages (Ording).
Office Action dated Jun. 19, 2012, received in U.S. Appl. No. 12/566,669, 34 pages (Chaudhri).
Office Action dated May 23, 2012, received in U.S. Appl. No. 12/566,671, 24 pages (Chaudhri).
Office Action dated Jun. 7, 2012, received in U.S. Appl. No. 12/566,673, 20 pages (Pisula).
Ahlberg, C. et al., "The Alphaslider: A Compact and Rapid Selector," ACM, Apr. 1994, proceedings of the SIGCHI conference on Human Factors in Computing Systems, pp. 365-371.
Roth et al., "Bezel Swipe: Conflict-Free Scrolling and Multiple Selection on Mobile Touch Screen Devices," Proceedings of the 27th International Conference on Human Factors in Computing Systems, Apr. 8, 2009, Boston MA, pp. 1523-1526.
International Search Report and Written Opinion for International Application No. PCT/US2008/086538, dated Jun. 2, 2009.
International Preliminary Report on Patentability dated Jul. 15, 2010, received in International Application No. PCT/US2008/086538, which corresponds to U.S. Appl. No. 12/240,974.
International Search Report and Written. Opinion dated Nov. 15, 2010, received in International Application No. PCT/US10/48443, which corresponds to U.S. Appl. No. 12/567,717.
International Search Report and Written Opinion dated May 11, 2011, received in International Application No. PCT/US2010/062319, which corresponds to U.S. Appl. No. 12/788,279.
Notice of Acceptance dated Sep. 14, 2010, received in Australian Application No. 2006321681, which corresponds to U.S. Appl. No. 11/322,553.
Office Action dated Nov. 9, 2010, received in Chinese Patent Application No. 200680052109.3, which corresponds to U.S. Appl. No. 11/322,553.
Office Action dated May 5, 2011, received in Chinese Patent Application No. 200680052109,3, which corresponds to U.S. Appl. No. 11/322,553.
Office Action dated Jan. 10, 2012, received in Chinese Patent Application No. 200680052109.3, which corresponds to U.S. Appl. No. 11/322,553, 17 pages (Ording).
Office Action dated Apr. 6, 2011, received in German patent application No. 11 2006 003 309.3, which corresponds to U.S. Appl. No. 11/322,553.
Office Action dated Apr. 6, 2011, received in German Patent Application No. 11 2006 004 220.3, which corresponds to U.S. Appl. No. 11/322,553.
Office Action dated Jan. 5, 2011, received in Korean Patent Application No. 10-2009-7011991, which corresponds to U.S. Appl. No. 11/322,553.
Office Action dated May 6, 2011, received in Chinese Patent Application No. 201010516160.3, which corresponds to U.S. Appl. No. 11/322,547.
Office Action dated Oct. 5, 2011, received in U.S. Appl. No. 12/240,974.
Notice of Allowance dated May 3, 2012, received in U.S. Appl. No. 12/240,974, 13 pages (Gehani).
Office Action dated Apr. 23, 2012, received in Chinese Patent Application No. 201010292415.2, which corresponds to U.S. Appl. No. 12/567,717, 9 pages (Marr).

* cited by examiner

ACCELERATED SCROLLING FOR A MULTIFUNCTION DEVICE

RELATED APPLICATIONS

This application claims priority to U.S. Provisional Patent Application No. 61/160,680, "Accelerated Scrolling for a Multifunction Device," filed on Mar. 16, 2009, which is incorporated by reference herein in its entirety.

TECHNICAL FIELD

The disclosed embodiments relate generally to electronic devices with touch-sensitive surfaces and displays that present scrollable information to users. More particular, the disclosed embodiments relate to accelerated scrolling of information on devices with touch sensitive surfaces.

BACKGROUND

Applications on multifunction devices may show information to a user, and the information may not all fit within the display of the multifunction device. For example, a multi-page electronic document may extend beyond the display. In this case, a user must scroll through the information.

Typical scrolling methods scroll through information based on finger movement, and the amount of scrolling is the same as the amount of finger movement. For example, when scrolling through an electronic contact list, the list may scroll through five contacts when the user's finger moves two centimeters.

When the information on the display of a multifunction device is lengthy, scrolling at a fixed rate is slow and inefficient. For example, it could take a very long time to scroll through a hundred page document or a contact list with several hundred contacts.

Accordingly, there is a need for multifunction devices with faster, more efficient methods and interfaces for scrolling information. Such methods and interfaces may complement or replace conventional methods for scrolling. Such methods and interfaces reduce the cognitive burden on a user and produce a more efficient human-machine interface. For battery-operated multifunction devices, such methods and interfaces conserve power and increase the time between battery charges.

SUMMARY

The above deficiencies and other problems associated with user interfaces for multifunction devices with touch-sensitive surfaces are reduced or eliminated by the disclosed devices. In some embodiments, the device is a desktop computer. In some embodiments, the device is portable (e.g., a notebook computer or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include one or more of: image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a computer-implemented method is performed at a multifunction device with a display and a touch-sensitive surface. The method includes detecting multiple input gestures by a user, beginning with an initial input gesture. For each input gesture after the initial input gesture, the method scrolls information on the display at a respective scrolling speed. The respective scrolling speed is determined based on the respective input gesture movement speed in the input gesture and a movement multiplier. The method determines whether the respective input gesture meets one or more swipe gesture criteria, and determines whether the respective input gesture meets one or more successive gesture criteria. When the input gesture meets the one or more swipe gesture criteria and the one or more successive gesture criteria, the method updates the movement multiplier in accordance with one or more movement multiplier adjustment criteria. It should be appreciated that this method has corresponding multifunction device and computer readable storage medium embodiments.

In accordance with some embodiments, a computer-implemented method is performed at a multifunction device with a display and a touch-sensitive surface. The computer-implemented method includes: detecting a succession of finger gestures by a user's finger on the touch-sensitive surface, including an initial finger gesture; and, for each respective finger gesture after the initial finger gesture in the succession of finger gestures: scrolling information on the display at a respective scrolling speed, where the respective scrolling speed is determined in accordance with a respective finger movement speed in the respective finger gesture and a finger movement multiplier; determining whether the respective finger gesture meets one or more predetermined swipe gesture criteria; determining whether the respective finger gesture meets one or more predetermined successive gesture criteria; and, when the respective finger gesture meets the one or more predetermined swipe gesture criteria and the one or more predetermined successive gesture criteria, updating the finger movement multiplier in accordance with one or more predetermined finger movement multiplier adjustment criteria.

In accordance with some embodiments, a multifunction device includes a touch-sensitive surface, a display, one or more processors, memory, and one or more programs. The one or more programs are stored in the memory and configured to be executed by the one or more processors. The one or more programs include instructions for: detecting a succession of finger gestures by a user's finger on the touch-sensitive surface, including an initial finger gesture; and, for each respective finger gesture after the initial finger gesture in the succession of finger gestures: scrolling information on the display at a respective scrolling speed, where the respective scrolling speed is determined in accordance with a respective finger movement speed in the respective finger gesture and a finger movement multiplier; determining whether the respective finger gesture meets one or more predetermined swipe gesture criteria; determining whether the respective finger gesture meets one or more predetermined successive gesture criteria; and, when the respective finger gesture meets the one or more predetermined swipe gesture criteria and the one or more predetermined successive gesture criteria, updating the finger movement multiplier in accordance with one or more predetermined finger movement multiplier adjustment criteria.

In accordance with some embodiments, a computer readable storage medium has stored therein instructions which when executed by a multifunction device with a touch-sensitive surface and a display, cause the device to: detect a succession of finger gestures by a user's finger on the touch-sensitive surface, including an initial finger gesture; and, for each respective finger gesture after the initial finger gesture in the succession of finger gestures: scroll information on the display at a respective scrolling speed, where the respective scrolling speed is determined in accordance with a respective finger movement speed in the respective finger gesture and a finger movement multiplier; determine whether the respective finger gesture meets one or more predetermined swipe gesture criteria; determine whether the respective finger gesture meets one or more predetermined successive gesture criteria; and, when the respective finger gesture meets the one or more predetermined swipe gesture criteria and the one or more predetermined successive gesture criteria, update the finger movement multiplier in accordance with one or more predetermined finger movement multiplier adjustment criteria.

In accordance with some embodiments, a multifunction device includes: a touch-sensitive surface; a display; means for detecting a succession of finger gestures by a user's finger on the touch-sensitive surface, including an initial finger gesture; means for scrolling information on the display at a respective scrolling speed, where the respective scrolling speed is determined in accordance with a respective finger movement speed in the respective finger gesture and a finger movement multiplier; means for determining, for each respective finger gesture after the initial finger gesture in the succession of finger gestures, whether the respective finger gesture meets one or more predetermined swipe gesture criteria; means for determining whether the respective finger gesture meets one or more predetermined successive gesture criteria; and, means for updating the finger movement multiplier in accordance with one or more predetermined finger movement multiplier adjustment criteria when the respective finger gesture meets the one or more predetermined swipe gesture criteria and the one or more predetermined successive gesture criteria.

Thus, multifunction devices with touch-sensitive surfaces are provided with faster, more efficient methods and interfaces for scrolling, thereby increasing the effectiveness, efficiency, and user satisfaction with such devices. Such methods and interfaces may complement or replace conventional methods for scrolling.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
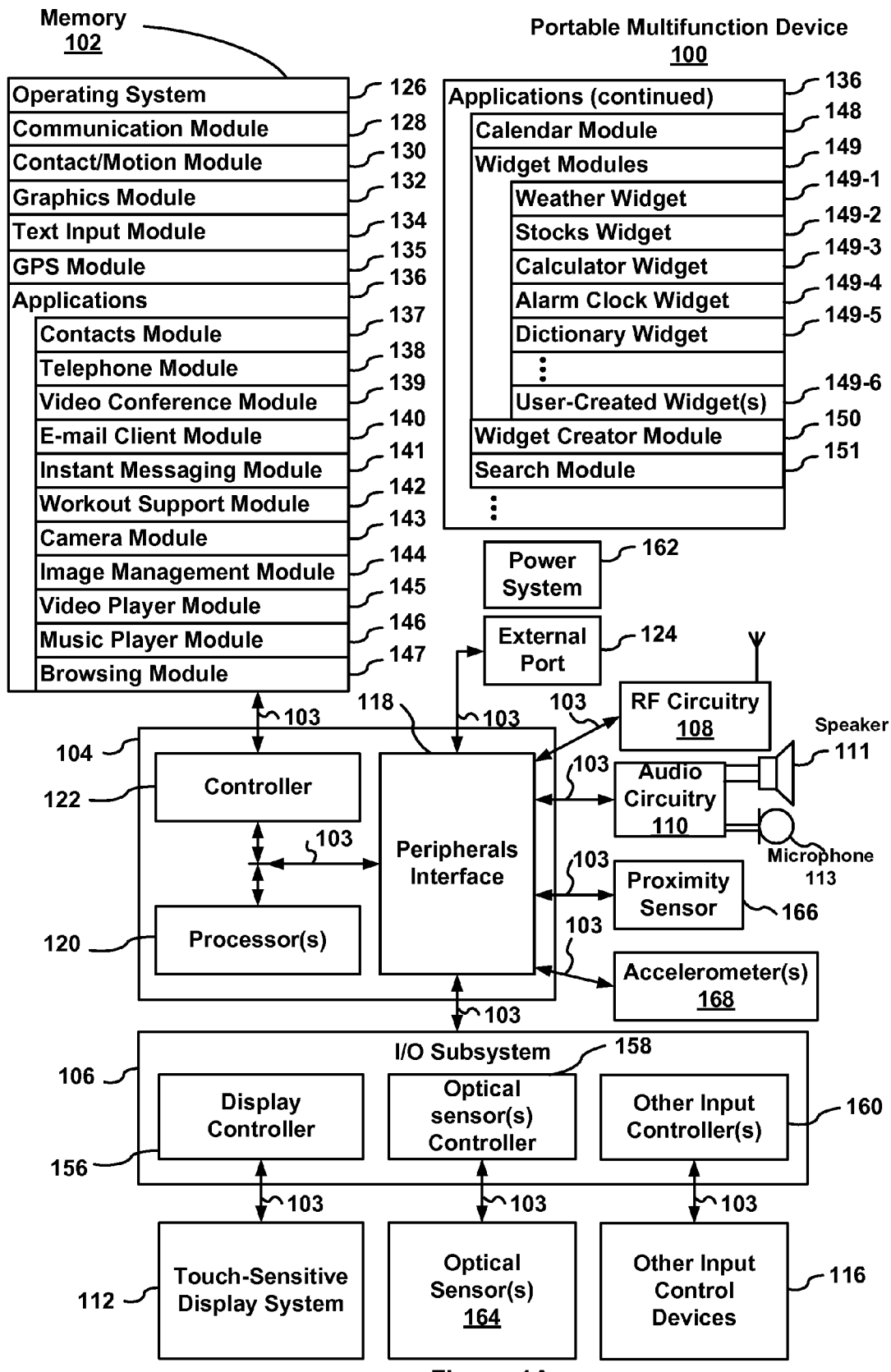
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Inc. of Cupertino, Calif.

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
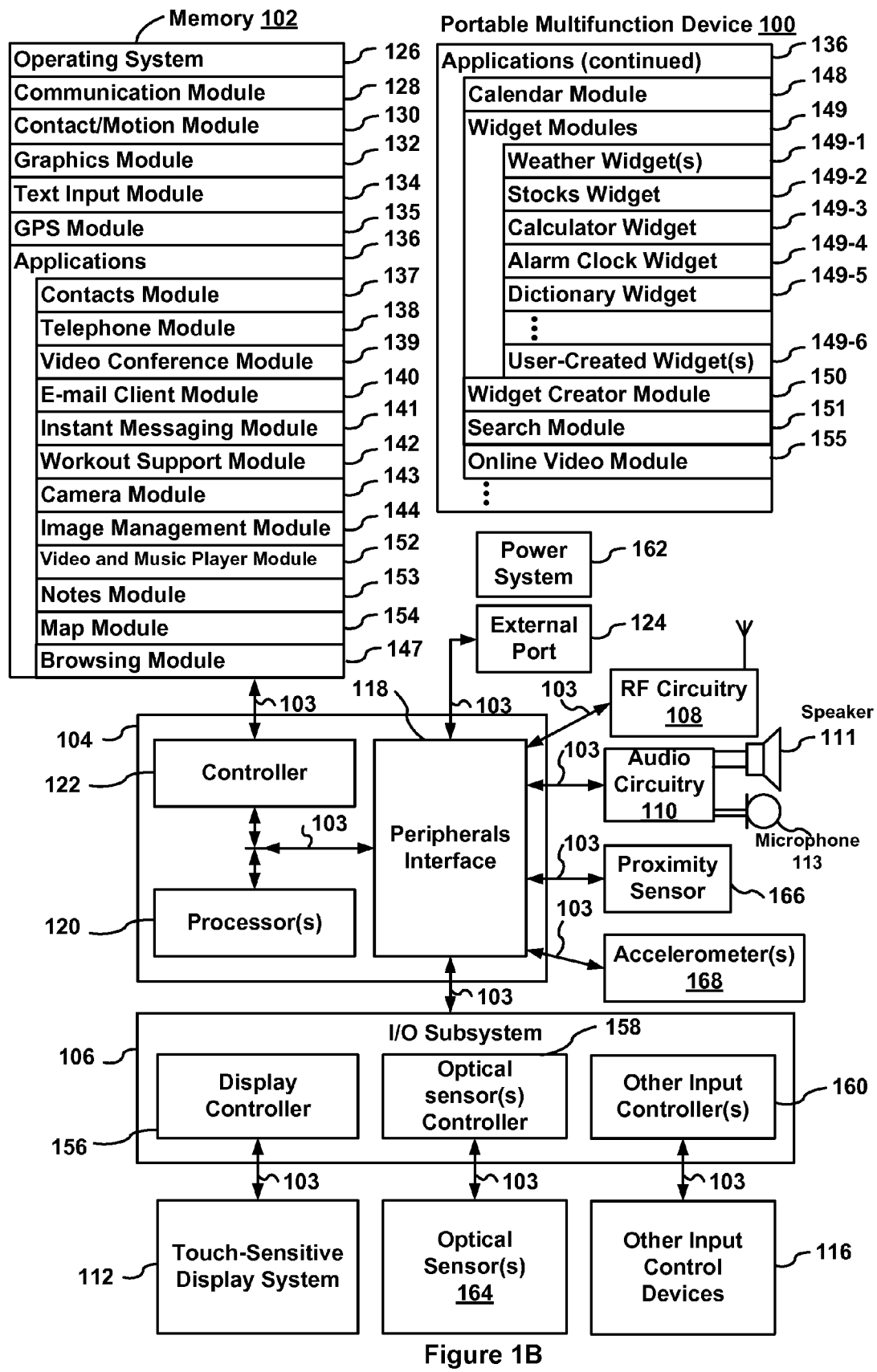

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include memory 102, a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122. Memory 102, or the non-volatile memory of memory 102, includes one or more computer readable storage mediums.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 (e.g., in a computer readable storage medium of memory 102) may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

In some embodiments, the contact/motion module 130 (FIG. 3) detects finger swipe gestures, and implements scrolling of information on the display (112, FIG. 2; 340, FIG. 3) of the device when one or more finger swipe gestures made with a user's finger meet predefined criteria. Scrolling information on a display is described below with reference to FIGS. 6A-6E.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
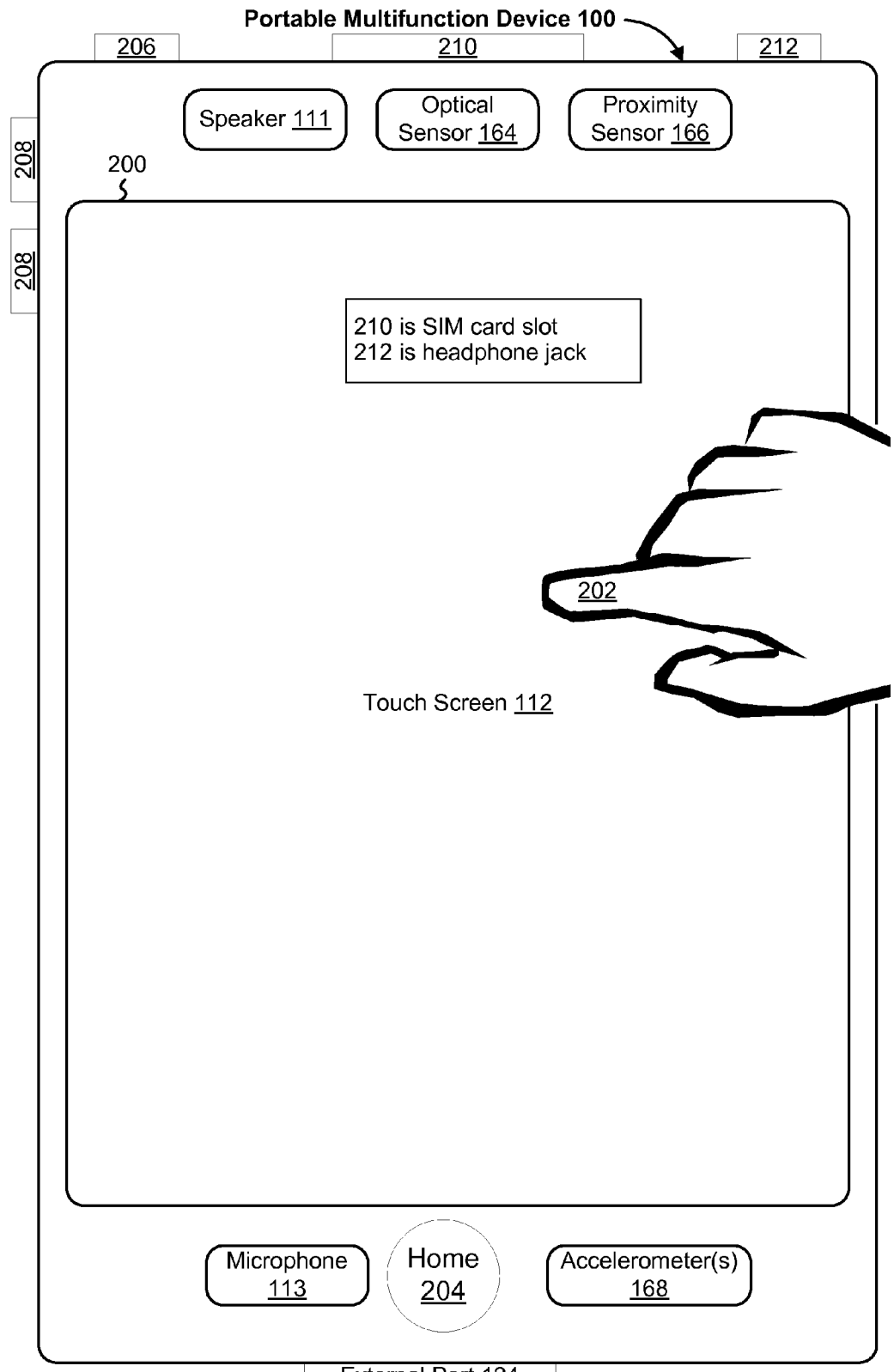
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
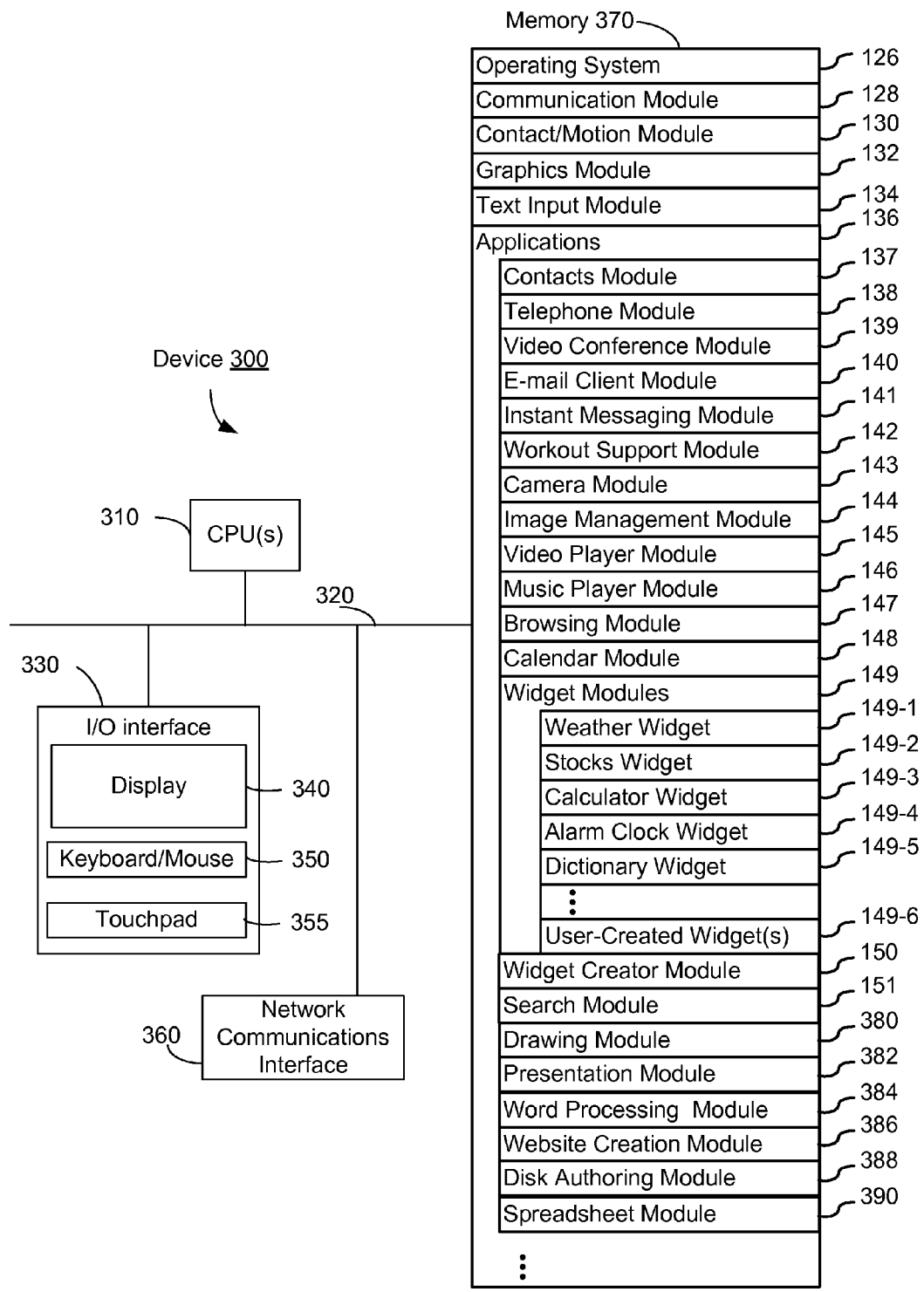
FIG. 3 is a block diagram of an exemplary computing device with a display and a touch-sensitive surface in accordance with some embodiments.

FIG. 3 is a block diagram of an exemplary computing device with a display and a touch-sensitive surface in accordance with some embodiments. Device 300 need not be portable. In some embodiments, the device 300 is a laptop computer, a desktop computer, a table computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which in some embodiments is a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
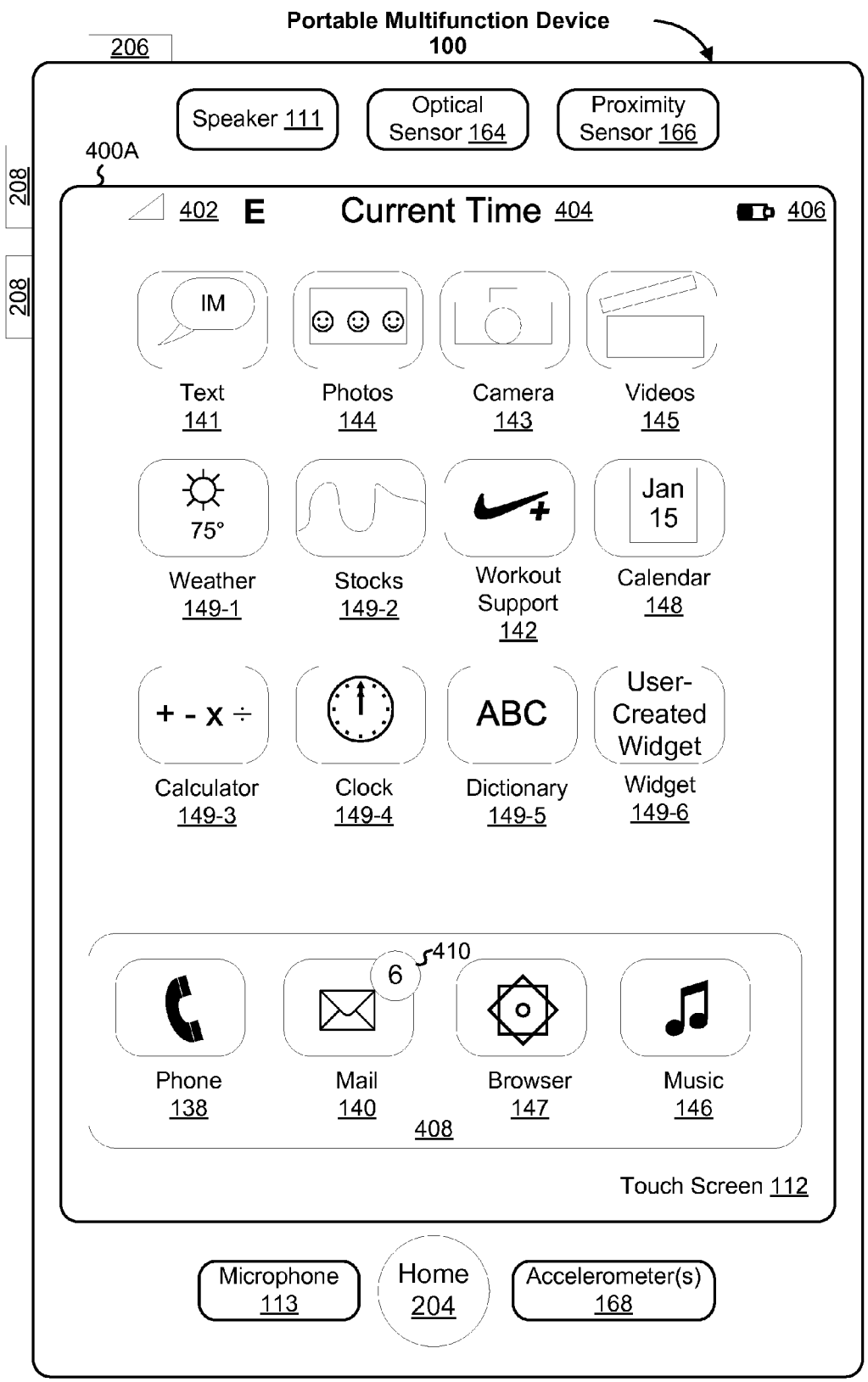
FIGS. 4A and 4B illustrate exemplary user interfaces for a menu of applications on a portable multifunction device in accordance with some embodiments.
Figure 4B:
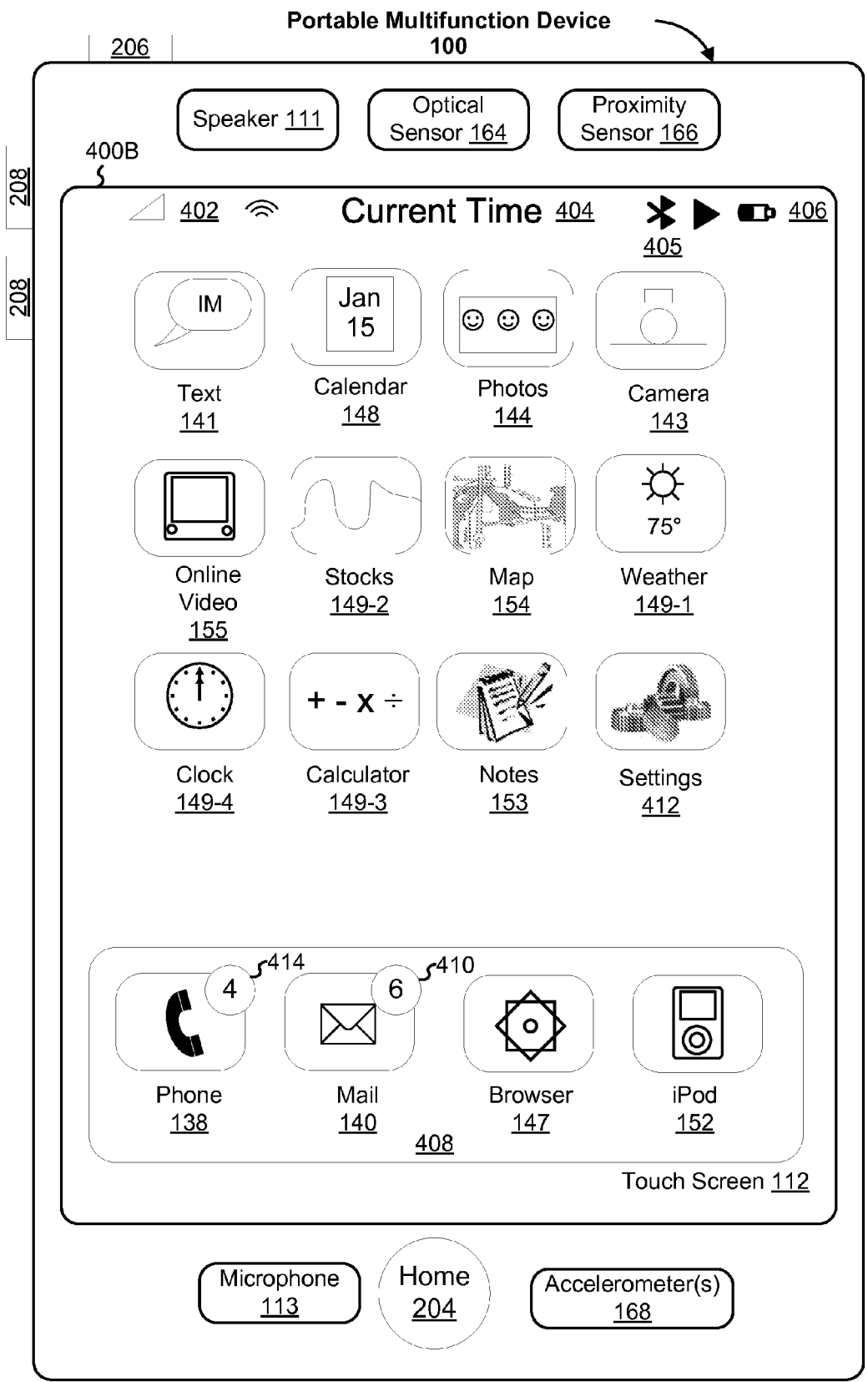

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Music player 146; and Icons for other applications, such as:
 IM 141;
 Image management 144;
 Camera 143;
 Video player 145;
 Weather 149-1;
 Stocks 149-2;
 Workout support 142;
 Calendar 148;
 Calculator 149-3;
 Alarm clock 149-4;
 Dictionary 149-5; and
 User-created widget 149-6.

In some embodiments, user interface 400B includes the following elements, or a subset or superset thereof:
 402, 404, 405, 406, 141, 148, 144, 143, 149-3, 149-2, 149-1, 149-4, 410, 414, 138, 140, and 147, as described above;
 Map 154;
 Notes 153;
 Settings 412, which provides access to settings for the device 100 and its various applications 136, as described further below;
 Video and music player module 152, also referred to as iPod (trademark of Apple Inc.) module 152; and
 Online video module 155, also referred to as YouTube (trademark of Google Inc.) module 155.

Attention is now directed towards embodiments of user interfaces ("UI") and associated processes that may be implemented on a multifunction device with a display and a touch-sensitive surface, such as device 300 or portable multifunction device 100.

Figure 5A:
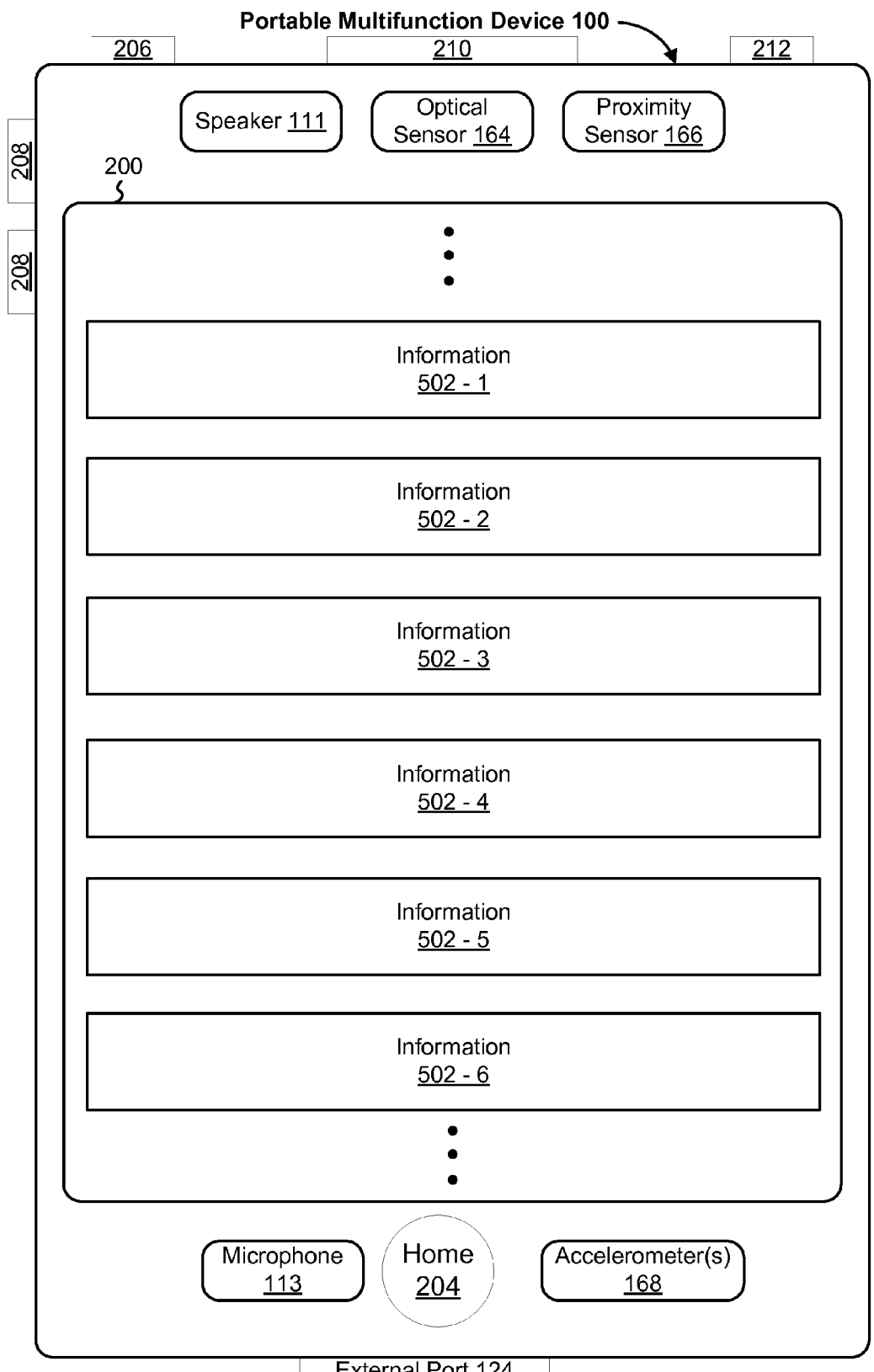
FIGS. 5A-5E illustrate scrolling on a touch screen display in accordance with some embodiments.
Figure 5B:
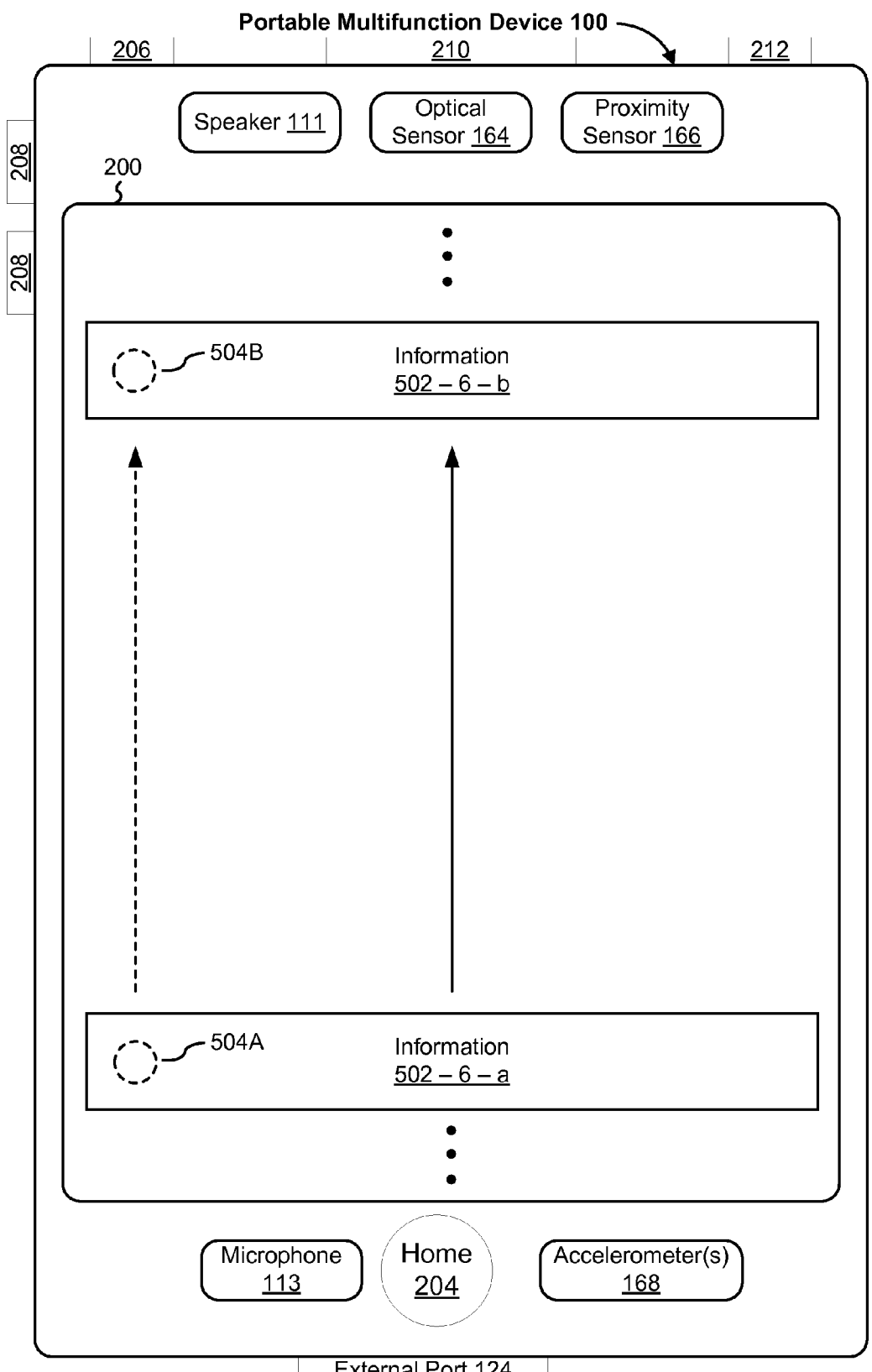
Figure 5C:
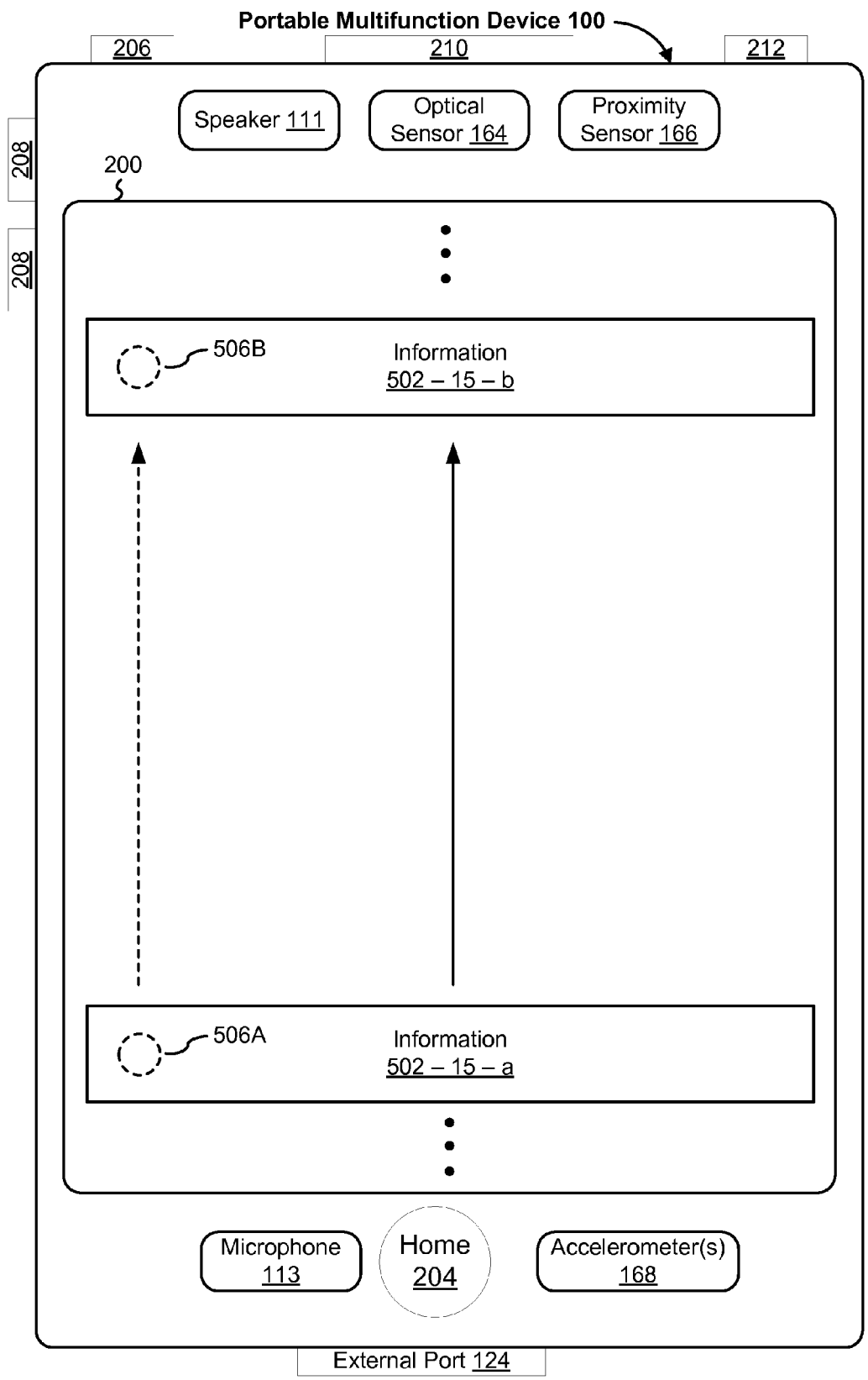
Figure 5D:
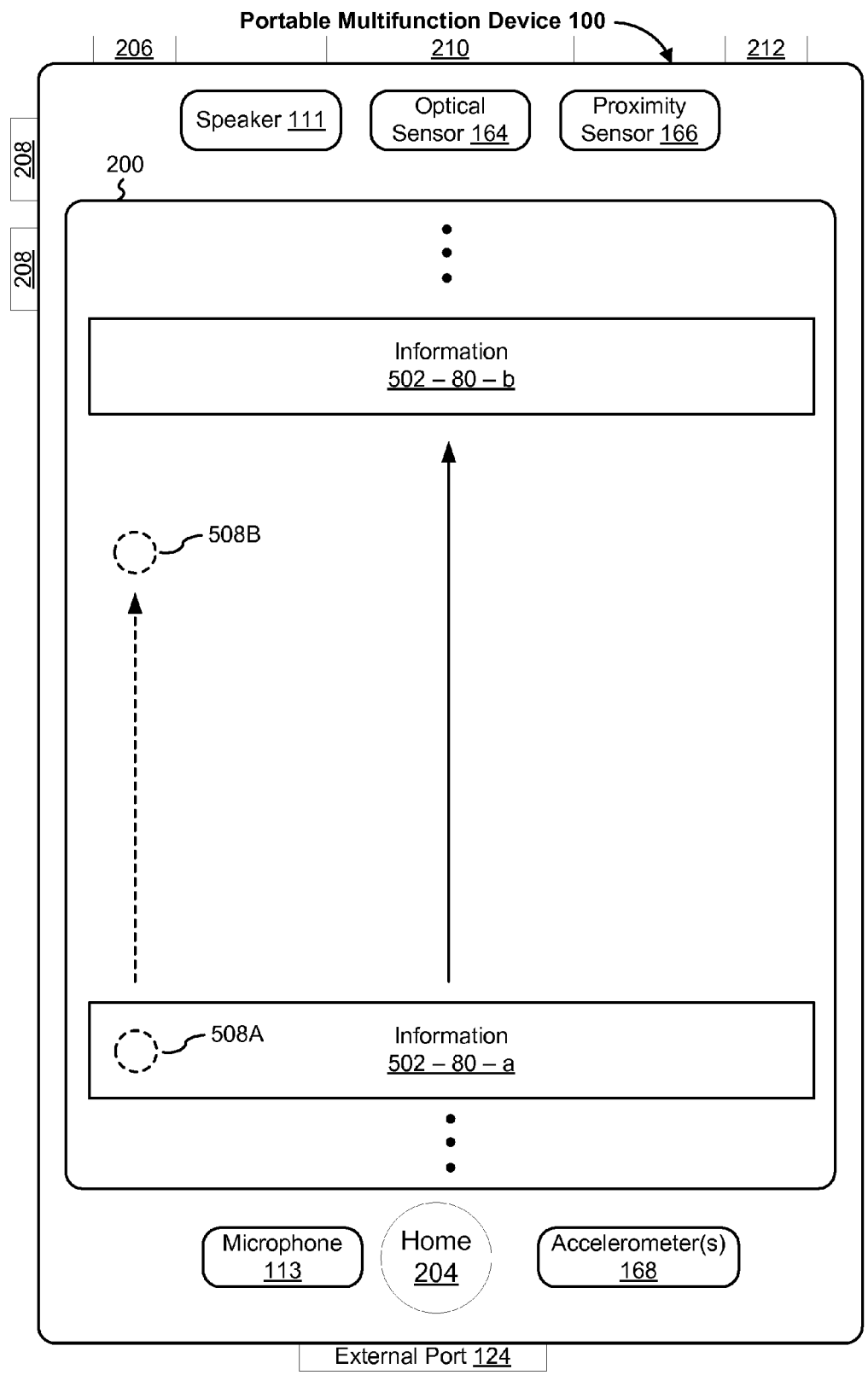
Figure 5E:
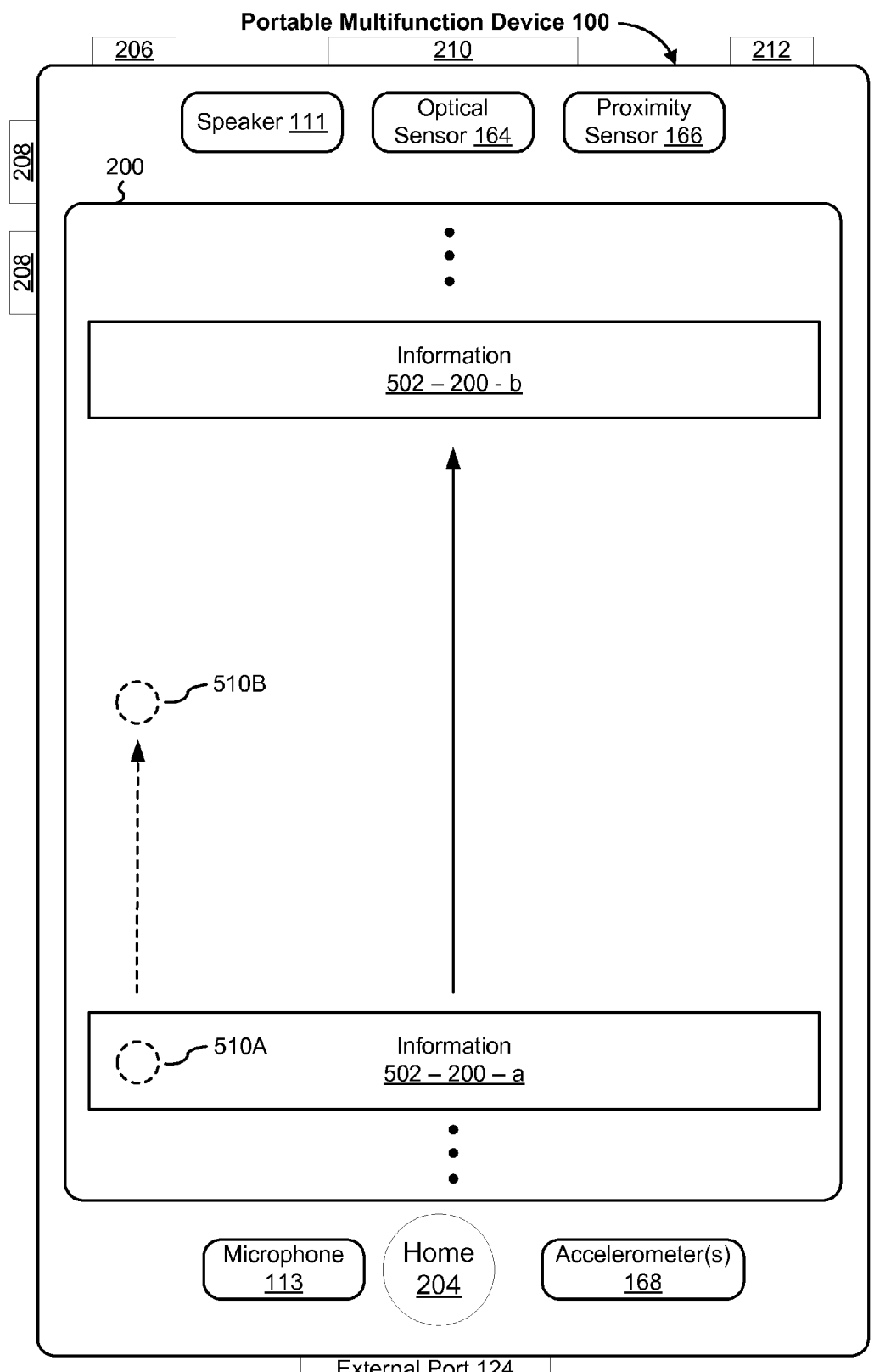

FIGS. 5A-5E illustrate an exemplary series of finger gestures on a touch-screen device according to one embodiment. FIG. 5A show six items of information 502-1 to 502-6 on User Interface 200. These items may be items within a scrollable list of items. FIG. 5B illustrates an initial finger gesture, showing information item 502-6 at its initial location 502-6-*a* and at its final location 502-6-*b* after scrolling. The dotted circle 504A identifies the initial location of the user's finger during a first swipe, and dotted circle 504B identifies the final location of the user's finger during the first swipe. In FIG. 5B the amount of scrolling corresponds to the amount of finger movement. FIG. 5C illustrates a second finger gesture, with scrolling similar to FIG. 5B. FIGS. 5D and 5E illustrate accelerated scrolling during subsequent finger gestures, with the movement of information items on the display greater than the movement of the user's finger. The item of information at the bottom of the display is scrolled to the top while the user's finger moves part way up the display. FIGS. 5A-5E will be described more fully below with respect to FIGS. 6A-6E.

Figure 5F:
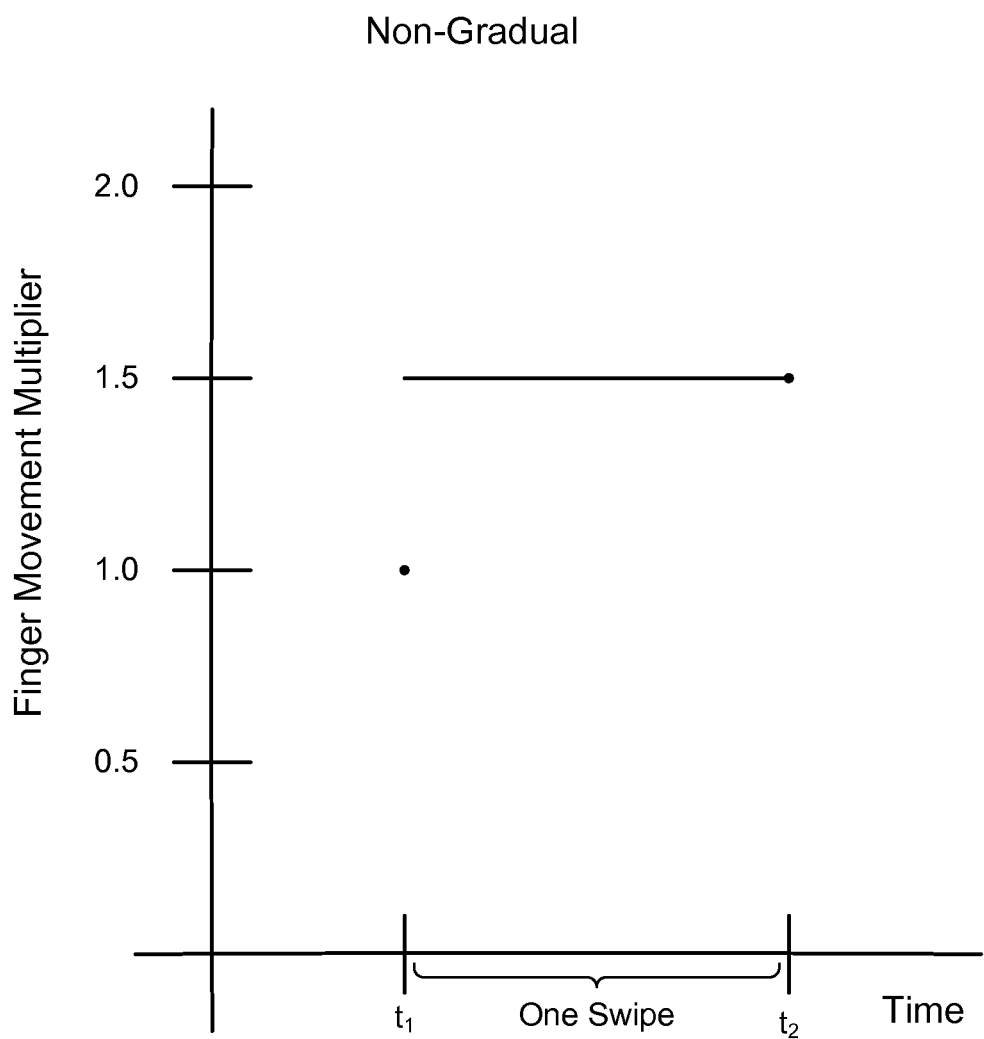
FIG. 5F illustrates a non-gradual increase of the finger movement multiplier in accordance with some embodiments.
Figure 5G:
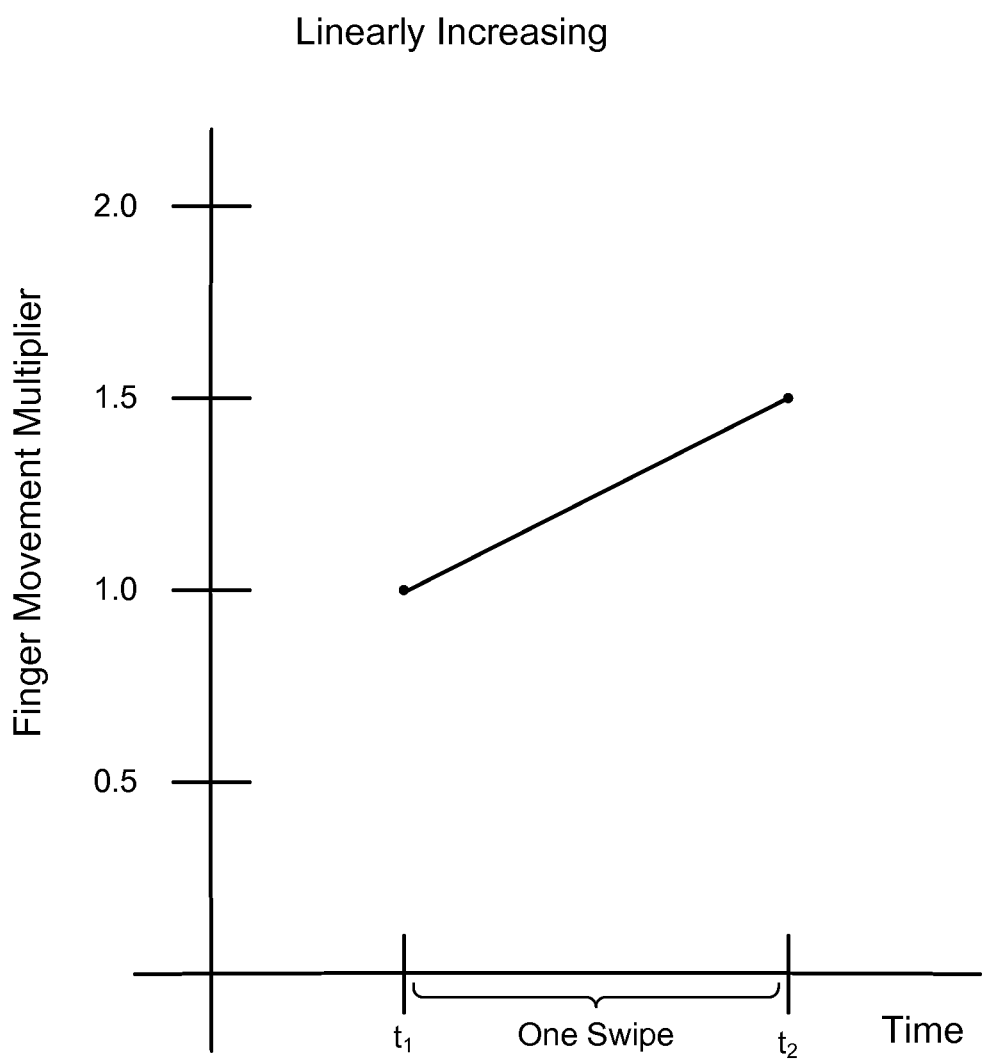
FIGS. 5G and 5H illustrate exemplary gradual increases of the finger movement multiplier during a finger gesture in accordance with some embodiments.
Figure 5H:
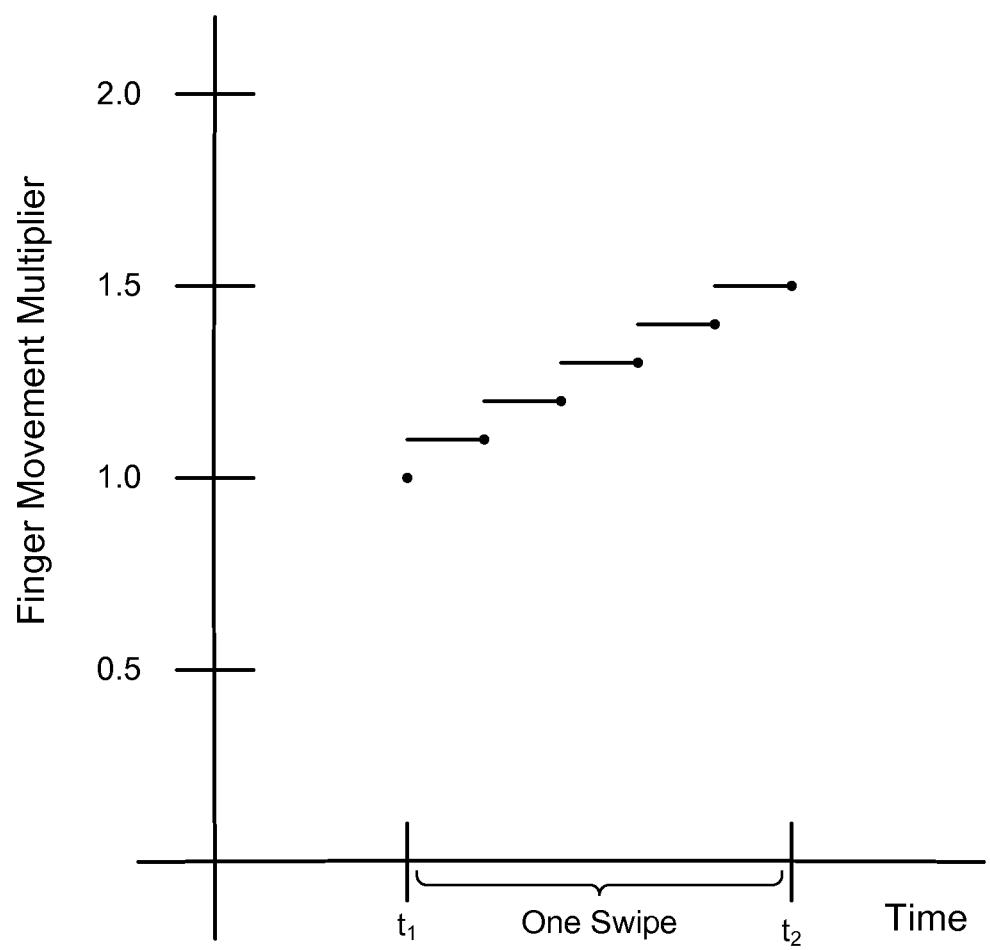

FIGS. 5F-5H illustrate exemplary ways to increase a finger movement multiplier. FIG. 5F illustrates the case where the finger movement multiplier changes in an instant from 1.0 to 1.5. FIGS. 5G and 5H illustrate cases where the increase in the finger movement multiplier is implemented gradually during a swipe gesture. FIGS. 5F-5H will be described in more detail below with respect to FIGS. 6A-6E.

Figure 5I:
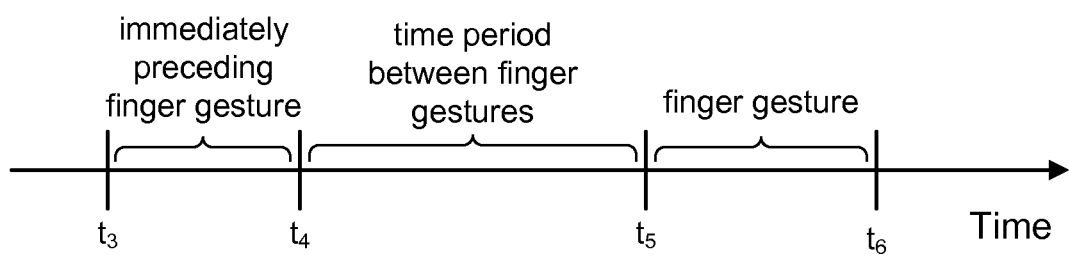
FIG. 5I illustrates a time line of a series of finger gestures in accordance with some embodiments.

FIG. 5I illustrates a partial time line with a series of finger gestures. FIG. 5I also illustrates the time period between two successive finger gestures. FIG. 5I will be described in more detail below with respect to FIGS. 6A-6E.

FIGS. 6A-6E are flow diagrams illustrating a method of scrolling in accordance with some embodiments. The method 600 is performed at a multifunction device (e.g., device 100, FIG. 2) with a display and a touch-sensitive surface. Some operations in method 600 may be combined and/or the order of some operations may be changed. In some embodiments, the contact/motion module 130 (FIG. 3) detects finger swipe gestures, and implements the scrolling of information on the display (112, FIG. 2; 340, FIG. 3) of the device in accordance with one or more of the methods illustrated in FIGS. 6A-6E.

In some embodiments, the touch-sensitive surface is separate from the display. For example, in some embodiments, the touch-sensitive surface is a touch pad that is a component of the multifunction device, but separate from the display.

In some embodiments, the method is performed by a portable multifunction device with a touch screen display (e.g., portable multifunction device 100 in FIG. 2). In these embodiments, the aforementioned touch-sensitive surface is on the device's display. In other words, the multifunction device's display is a touch screen display (e.g., display 112, FIG. 2).

As described below, the method 600 provides an intuitive way to efficiently scroll information on a display. Method 600 employs various criteria to determine when to accelerate scrolling, thus enabling a user to reach desired information more quickly. The method reduces the cognitive burden on a user when scrolling, thereby creating a more efficient human-machine interface. For battery-operated computing devices, enabling a user to scroll information more quickly and efficiently conserves power and increases the time between battery charges.

Figure 6A:
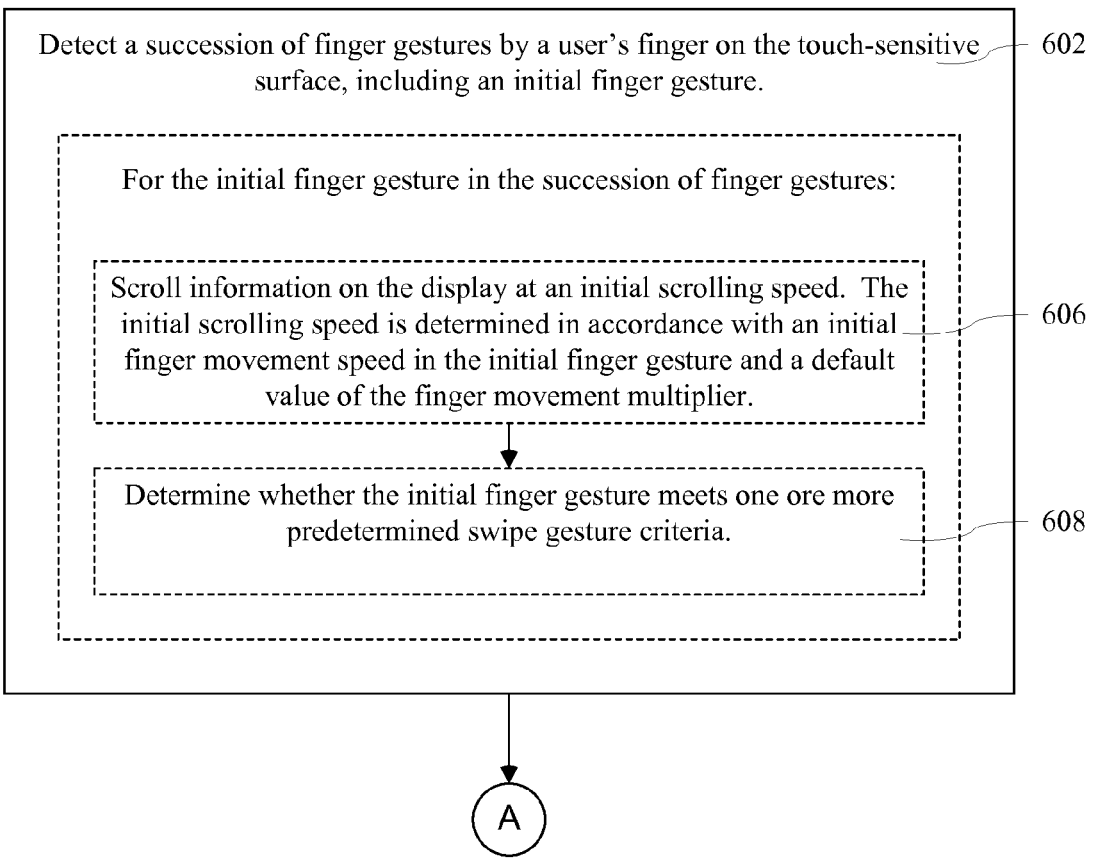
FIGS. 6A-6E are flow diagrams illustrating a method of scrolling in accordance with some embodiments.
Figure 6B:
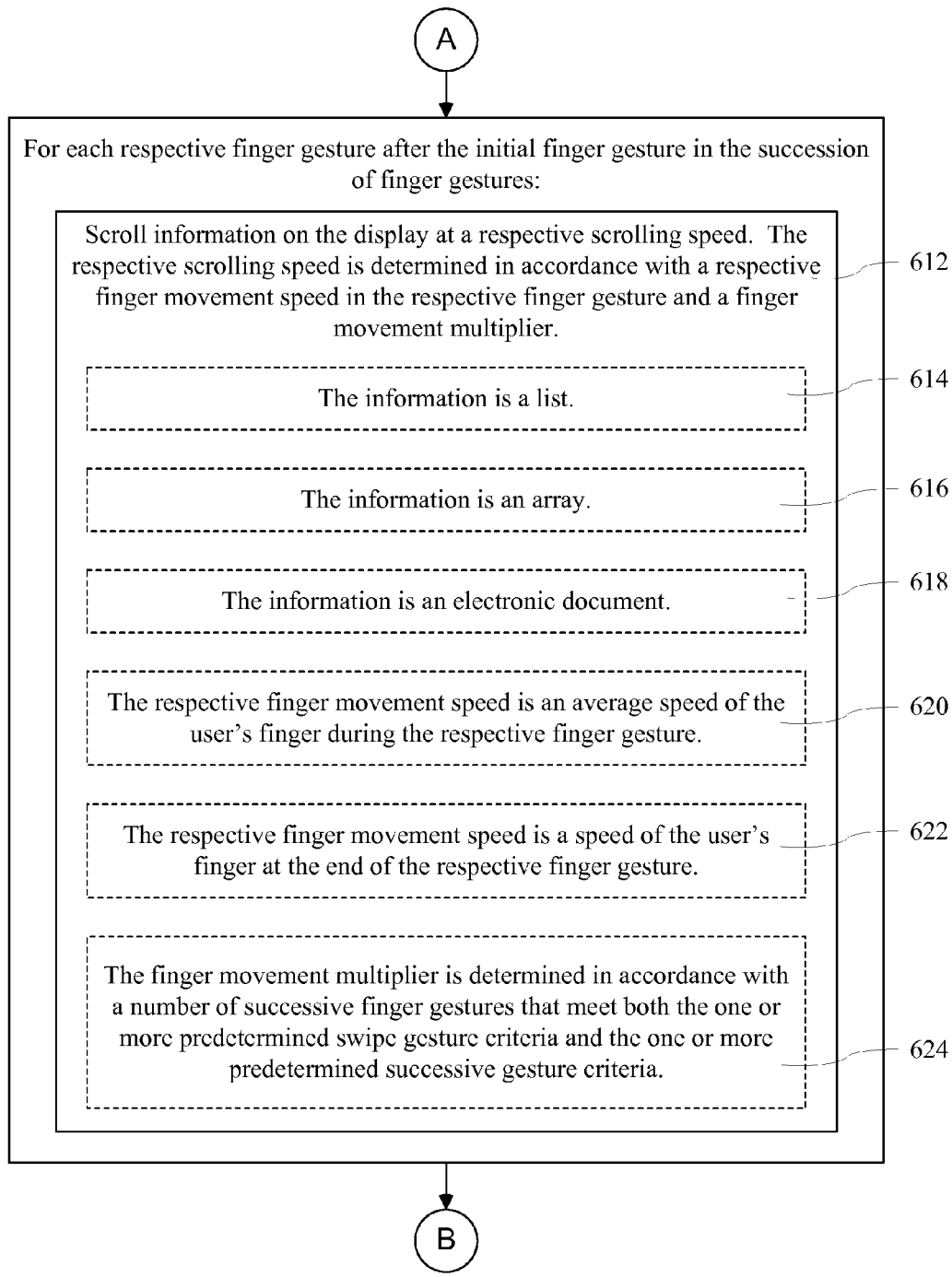
Figure 6C:
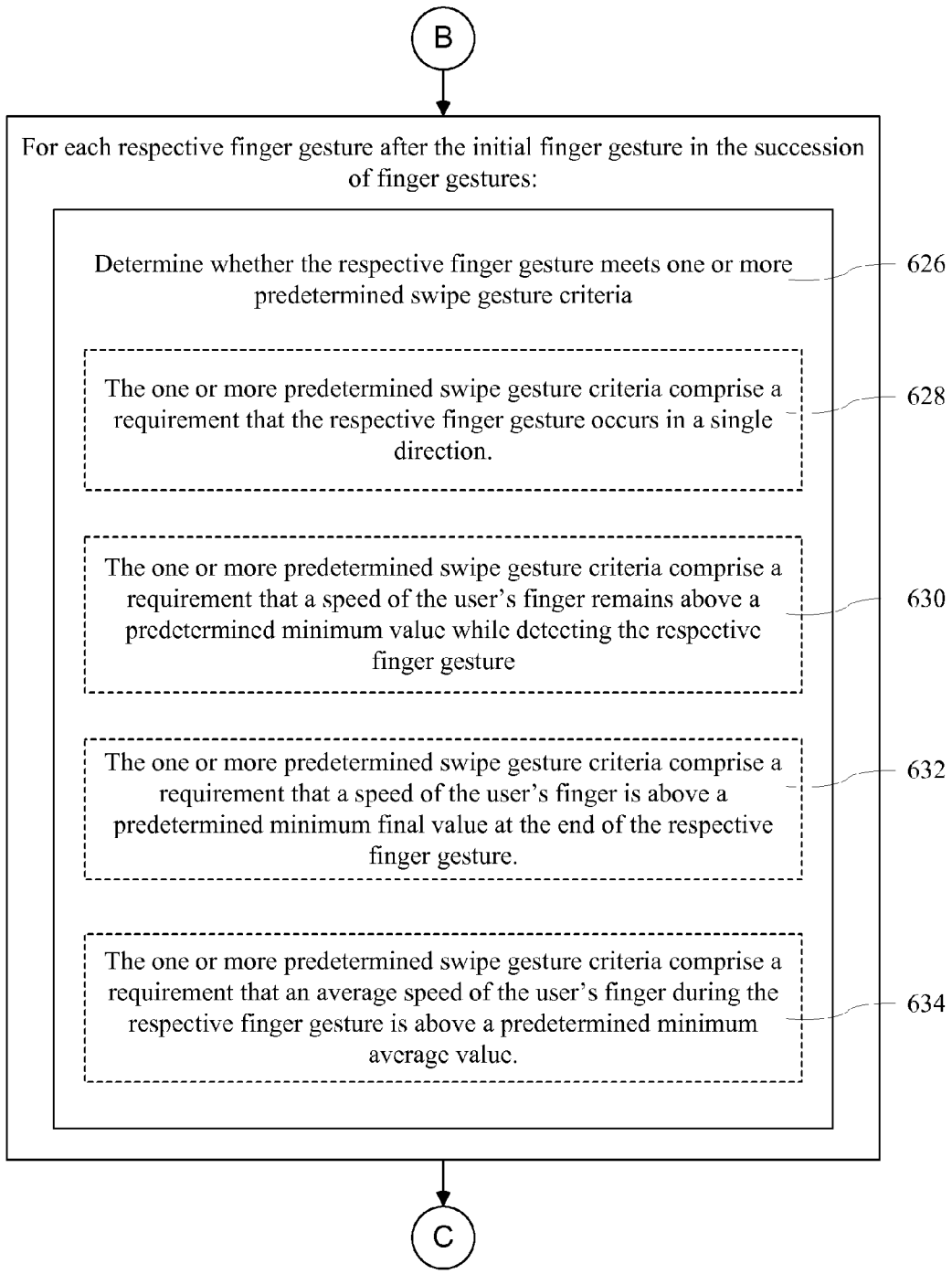
Figure 6D:
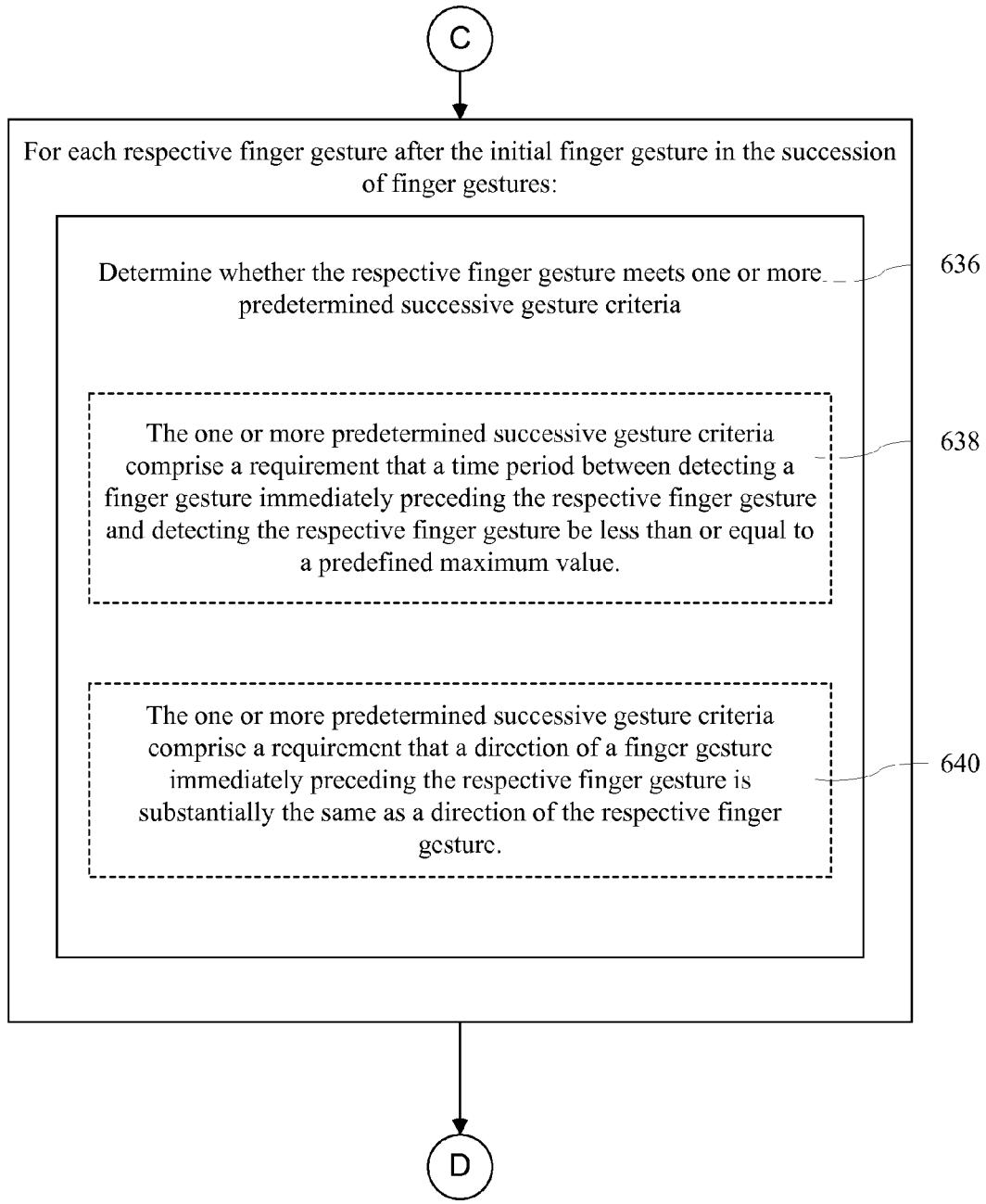
Figure 6E:
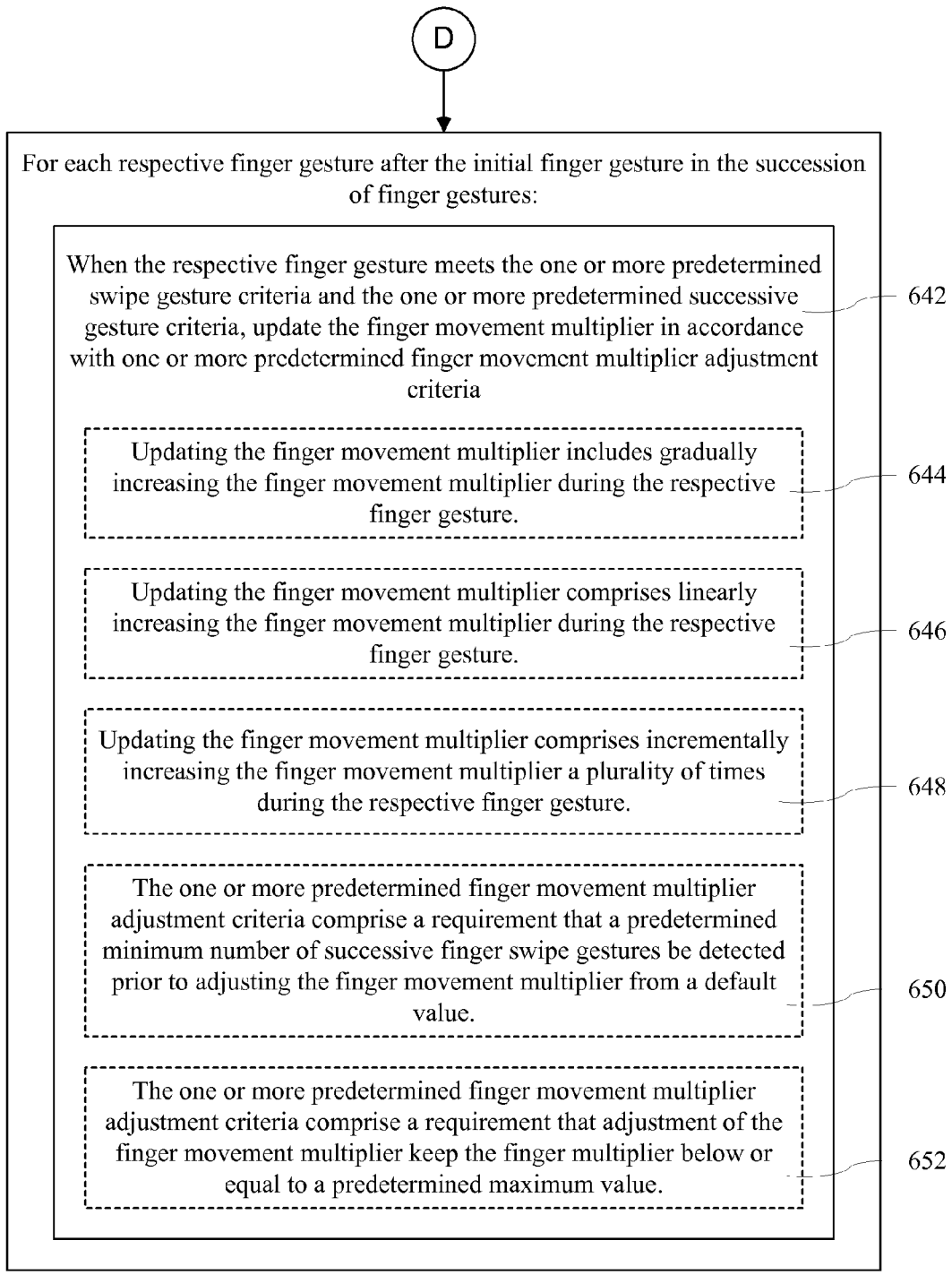

A multifunction device with a display and a touch-sensitive surface detects (602) a series of finger gestures by a user's finger on the touch-sensitive surface. The series begins with an initial finger gesture. In some embodiments, method 600 scrolls (606) information on the display at an initial scrolling speed for the initial finger gesture. In some embodiments the initial scrolling speed is based on the initial finger movement speed in the initial finger gesture and a default finger movement multiplier. For example, the default value for the finger movement multiplier may be 1.0. In some embodiments, method 600 determines (608) whether the initial finger gesture is a "swipe." This determination is based on one or more swipe gesture criteria. Exemplary criteria to determine whether a finger gesture is a swipe are described below at 628-634 in the flow diagram (FIG. 6C).

For each subsequent finger gesture, method 600 scrolls (612) information on the display at a scrolling speed that is determined by the finger movement speed during the finger gesture and the finger movement multiplier. For example, when the finger movement multiplier is 1.0, the scrolling on the display is at the same speed as the finger. If the finger movement multiplier is 2.0, the scrolling speed is twice as fast as the speed of the finger.

Described from another perspective, the amount of scrolling during a finger gesture is determined by the amount of finger movement during the finger gesture and the finger movement multiplier.

In some embodiments scrolling continues even after the user's finger lifts off the touch sensitive surface. For example, scrolling of the information on the display may be governed by a momentum and friction model, in which the displayed information is treated as having a certain speed (or momentum) at the end of each swipe gesture, and therefore continues to scroll after the swipe gesture. In the absence of any subsequent finger gestures that interrupt or further accelerate the scrolling, the scrolling slows down in accordance with a model, such as a friction model, or in accordance with a predefined amount of deceleration until either the scroll speed reaches a terminal value (e.g., zero), or the end of the displayed information is reached.

FIGS. 5A-5E illustrate the scrolling according to some embodiments. FIG. 5A illustrates an initial screen with items of information prior to a series of finger gestures. FIGS. 5B-5E illustrate subsequent finger gestures in the series. FIGS. 5B and 5C illustrate scrolling of a list of items, with a finger movement multiplier of 1.0. In each of these figures the item of information initially at the bottom (502-6-*a* and 502-15-*a*, respectively) scrolls to the top (502-6-*b* and 502-15-*b*, respectively) during a finger gesture. The dotted circles in FIGS. 5B and 5C indicate the position of the user's finger at the beginning and end of the finger gesture, thereby indicating the movement of the user's finger during those gestures (e.g., the first and second vertical swipes in a series of swipes). In FIG. 5B the user's finger moves from 504A to 504B, and in FIG. 5C the user's finger moves from 506A to 506B. In each of these figures the amount of scrolling matches the amount of finger movement.

FIGS. 5D and 5E illustrate accelerated scrolling according to some embodiments in response to successive swipe finger gestures by a user's finger. In these figures the information initially at the bottom (502-80-*a* and 502-200-*a*, respectively) scrolls to the top (502-80-*b* and 502-200-*b*, respectively) during a portion of the finger gesture. The dotted circles in FIGS. 5D and 5E illustrate the movement of the user's finger during the course of two successive swipe finger gestures. In FIG. 5D the user's finger moves from 508A to 508B, and in FIG. 5E the user's finger moves from 510A to 510B. In FIGS. 5D and 5E information formerly at the bottom of the display has scrolled all the way to the top in response to a finger movement whose length is smaller than the distance traveled by the respective information items (508A/508B, 510A/510B), thus illustrating accelerated scrolling. FIG. 5E illustrates greater accelerated scrolling than FIG. 5D because FIG. 5E shows greater scrolling relative to the amount of finger movement.

In some embodiments the information displayed is a list (614). For example, the information displayed may be a list of contacts, a list of calendar entries, a list of content in a media player, a list of electronic messages (e.g., email messages), a list of applications, a drop-down list, a list of search results, a list of files, or the like.

In some embodiments the information is an array (616). For example, the information may be an array of thumbnail images in an image management application.

In some embodiments the information is an electronic document (618). For example, the information may be an electronic book, a web page, a PDF file, a word processing document, an electronic presentation, a spreadsheet, or the like. Any electronic information whose rendering as an image is larger than the user's display will typically be scrolled to view different portions of the information.

There are a variety of ways to specify how the finger movement speed is calculated. In some embodiments, the finger movement speed is the average speed of the user's finger during the finger gesture (620). In some embodiments the finger movement speed is the speed of the user's finger at the end of the finger gesture (622). For example, once the user's finger lifts off of the touch sensitive surface (thus ending the finger gesture), the speed of the user's finger at lift off, or over a time interval immediately prior to detecting lift off, is used as the finger movement speed. When using a time interval immediately prior to lift off, exemplary time intervals may be 20 milliseconds, 50 milliseconds, or 100 milliseconds. In other embodiments, the finger movement speed may be determined by the average speed of the user's finger during a time interval that is not at the end of the finger gesture. In yet other embodiments, the finger movement speed may be determined during multiple successive time intervals, each having a fixed duration (e.g., 20 to 50 milliseconds).

In some embodiments the finger movement multiplier is determined based on a series of finger gestures (624). Each of the finger gestures in the series must satisfy certain swipe gesture criteria and certain successive gesture criteria (624). In some embodiments the initial (default) value for the finger movement multiplier is 1.0, and may increase as subsequent finger gestures meet both the swipe gesture criteria and the successive gesture criteria. In some embodiments, the finger movement multiplier resets to a default value when a subsequent finger gesture fails to satisfy either the swipe gesture criterion or the successive gesture criterion.

For each finger gesture after the initial finger gesture, method 600 determines (626) whether the finger gesture satisfies certain swipe gesture criteria. In some embodiments one of the swipe gesture criteria is a requirement that the finger gesture occurs in a single direction (628). For example, the finger gesture may be an upward swipe, a downward swipe, a right-to-left swipe, a left-to-right swipe, or a diagonal swipe where the user's finger moves substantially in a single direction.

Because scrolling is generally limited to specific directions, a human user need not be precise about the direction of finger movement. For example, an upward swipe may include portions who direction of movement differs from vertical by as much as ±10°, or in other embodiments by as much as ±20°. During such a finger gesture the user's finger moves in substantially a single direction: upward (i.e., with a pre-defined deviation, such as ±10°, and which does not exceed) ±20°.

In some embodiments one of the swipe gesture criteria is a requirement that the speed of the user's finger stays above a specified minimum speed value during the finger gesture (630). For example, the specified minimum speed value could be 150 mm/sec. If the speed of the user's finger varies between 170 mm/sec and 250 mm/sec during the finger gesture, then it would satisfy the criterion. However, if the user's finger speed is only 140 mm/sec at some point in the finger gesture, the finger gesture would not satisfy the criterion. Of course, whether a finger gesture satisfies this criterion depends on the specified minimum speed value.

In some embodiments one of the swipe gesture criteria is a requirement that the speed of the user's finger is above a specified minimum final value at the end of the finger gesture (632). For example, once the user's finger lifts off of the touch sensitive surface, the speed of the user's finger at lift off, or over a time interval immediately prior to detecting lift off, must be above the specified minimum final value. When using a time interval immediately prior to lift off, exemplary time intervals may be 10 milliseconds, 20 milliseconds, 50 milliseconds, or 100 milliseconds.

In some embodiments one of the swipe gesture criteria is a requirement that the average speed of the user's finger during the finger gesture is above a specified minimum average value (634). For example, the specified minimum average value could be 150 mm/sec. Suppose the speed of the user's finger varies between 140 mm/sec and 200 mm/sec, with an average speed of 175 mm/sec. Even though the user's finger had a speed below 150 mm/sec during part of the finger gesture, the finger gesture satisfies the criterion because the average speed of 175 mm/sec was above the minimum 150 mm/sec.

For each finger gesture after the initial finger gesture, method 600 determines (636) whether the finger gesture satisfies certain successive gesture criteria. In some embodiments one of the successive gesture criteria is a requirement that the elapsed time between the end of the prior finger gesture and the beginning of the current finger gesture is less than or equal to a predefined maximum elapsed time (638). In one embodiment, the predefined maximum elapsed time is 1 second. In some other embodiments, the predefined maximum elapsed time is a fixed value equal to at least 0.6 seconds and that is not larger than 1.5 seconds. FIG. 5I illustrates two sequential finger gestures, and the elapsed time between the finger gestures is the time between $t_4$ and $t_5$. When the elapsed time between $t_4$ and $t_5$ exceeds the predefined maximum elapsed time, the finger gesture does not satisfy the criterion.

In some embodiments one of the successive gesture criteria is a requirement that the direction of the prior finger gesture is substantially the same as the direction of the current finger gesture (640). In some embodiments the directions of two finger gestures are substantially the same if their directions are both within a predefined number of degrees (e.g., ±5°, ±10°, or ±20°) of the same axial direction (i.e., vertically up, vertically down, horizontally left, or horizontally right). For example, if the maximum allowed deviation is 15 degrees, and a first finger gesture is 10 degrees to the left of vertically up, and the second finger gesture is 8 degrees to the right of vertically up, the "same direction" successive gesture criterion is met because both are within the allowed deviation of the vertically up direction. In some embodiments the angle of a finger gesture may be measured by drawing a line between the starting and ending points of the finger gesture, and determining the angle of that line within a coordinate system. In some embodiments the angle of a finger gesture may be determined by the movement of the finger at the end of the finger gesture, or during an interval of time just before the end of the finger gesture.

For each finger gesture after the initial finger gesture, method 600 updates (642) the finger movement multiplier according to finger movement multiplier adjustment criteria when the finger gesture satisfies the swipe gesture criteria and the successive gesture criteria. FIGS. 5F-5H illustrate exemplary ways that the finger movement multiplier may be adjusted during the finger gesture. FIG. 5F illustrates an embodiment where the finger movement multiplier changes in an instant (e.g., from a value of 1.0 to 1.5) at the beginning of the finger gesture. In alternative embodiments, the finger movement multiplier changes in an instant at the end of the finger gesture, or at some point in the middle of the finger gesture. In these embodiments the change to the finger movement multiplier is not gradual because it instantly changes from the old value to the new value.

In some embodiments updating the finger movement multiplier occurs gradually during the finger gesture (644). That is, updates to the finger movement multiplier occur so that the value of the finger movement multiplier changes gradually during the finger gesture. For example, the finger movement multiplier may increase by 0.002 each millisecond during a finger gesture, up to a predefined maximum increase (e.g., 0.5) per finger gesture. A gradual change to the finger movement multiplier can reduce the cognitive burden on the user by providing a smoother adjustment to the scrolling speed. Exemplary methods of gradually increasing the finger movement multiplier include linearly increasing the finger movement multiplier (646) during the finger gesture (e.g., the increase in multiplier may be a linear function of the distance traveled by the user's finger during the finger gesture, until a predefined maximum increase in the finger movement multiplier is reached), and incrementally increasing the finger movement multiplier (648) multiple times during the finger gesture (e.g., the finger movement multiplier may be increased by 0.05, or 0.10, each time the user's finger moves a predefined distance during the finger gesture, until a predefined maximum increase in the finger movement multiplier is reached). The finger movement multiplier vs. time graph in FIG. 5G shows how the finger movement multiplier could change during a finger gesture in embodiments where the finger movement multiplier is linearly increasing. The finger movement multiplier vs. time graph in FIG. 5H shows how the finger movement multiplier could change during a finger gesture in embodiments where the finger movement multiplier increases incrementally multiple times. As FIG. 5H shows, each incremental increase of the finger movement multiplier occurs in an instant, but each increase is small (e.g., steps of 0.10), unlike the single change to the finger movement multiplier illustrated in FIG. 5F. One of skill in the art would recognize that there are many other ways to implement changes to the finger movement multiplier.

In some embodiments one of the finger movement multiplier adjustment criteria is a requirement that a specified minimum number of successive finger swipe gestures must occur prior to adjusting the finger movement multiplier from the default value (650). This criterion may reduce the likelihood of scrolling past information desired by the user due to accelerated scrolling, especially when the desired information is close to the information displayed prior to the initiation of scrolling. In some embodiments the default value for the finger movement multiplier is 1.0.

In some embodiments one of the finger movement multiplier adjustment criteria is a requirement that adjustment of the finger movement multiplier is limited to a specified maximum value (652). For example, in some embodiments the maximum value of the finger movement multiplier is 3.0. If the finger movement multiplier might otherwise go above this value based on the other criteria, this criterion would limit the finger movement multiplier to 3.0.

In some embodiments, finger movements in the above described embodiments may be replaced with stylus movements or movements of any other input device capable of being used to produce a gesture. Furthermore, in some embodiments, finger movements may include movements of a user's finger or hand over a touch and hover sensitive surface.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A method, comprising:
   at a multifunction device with a display and a touch-sensitive surface:
      detecting a succession of finger gestures by a user's finger on the touch-sensitive surface, including an initial finger gesture, wherein each finger gesture of the succession of finger gestures comprises a finger swipe gesture that has a linear direction and ends with a finger lift-off; and, for each respective finger gesture after the initial finger gesture in the succession of finger gestures:

scrolling information on the display at a respective scrolling speed, wherein the respective scrolling speed is determined in accordance with a respective finger movement speed in the respective finger gesture and a finger movement multiplier;

determining whether the respective finger gesture meets one or more predetermined swipe gesture criteria, the predetermined swipe gesture criteria including a requirement that the speed of the respective finger swipe gesture's finger at lift-off exceeds a predetermined threshold for lift-off speed;

determining whether the respective finger gesture meets one or more predetermined successive gesture criteria, the one or more predetermined successive gesture criteria including that the direction of the respective finger gesture and the direction of a prior finger gesture of the succession of finger gestures meet predefined same linear direction criteria; and in accordance with a determination that the respective finger gesture meets the one or more predetermined swipe gesture criteria and the one or more predetermined successive gesture criteria, updating the finger movement multiplier in accordance with one or more predetermined finger movement multiplier adjustment criteria.

2. The method of claim 1, wherein the same linear direction criteria comprises a requirement that the respective finger gesture and the prior finger gesture are both within a predefined number of degrees of the same axial direction.

3. The method of claim 1, wherein the each finger gesture of the succession of finger gestures comprises a vertically up finger swipe gesture, vertically down finger swipe gesture, horizontally left finger swipe gesture or horizontally right finger swipe gesture.

4. The method of claim 1, wherein the predetermined successive gesture criteria includes a requirement that the number of successive finger swipe gestures exceeds a predetermined threshold.

5. The method of claim 1, wherein the one or more predetermined successive gesture criteria comprises a requirement that a time period between detecting a finger swipe gesture immediately preceding the respective finger swipe gesture and detecting the respective finger swipe gesture be less than a predefined maximum value.

6. The method of claim 1, wherein updating the finger movement multiplier includes gradually increasing the finger movement multiplier during the respective finger gesture.

7. The method of claim 1, wherein the predetermined successive gesture criteria includes a requirement that the speed of a respective finger swipe gesture and the speed of a prior finger swipe gesture of the succession of finger swipe gestures exceed a predetermined threshold for finger swipe speed.

8. The method of claim 1, wherein the one or more predetermined finger movement multiplier adjustment criteria includes a requirement that updating the finger movement multiplier is limited to a predefined maximum value.

9. A multifunction device, comprising:
a display;
a touch-sensitive surface;
one or more processors;
memory; and
one or more programs, wherein the one or more programs are stored in the memory and configured to be executed by the one or more processors, the one or more programs including instructions for:
detecting a succession of finger gestures by a user's finger on the touch-sensitive surface, including an initial finger gesture, wherein each finger gesture of the succession of finger gestures comprises a finger swipe gesture that has a linear direction and ends with a finger lift-off; and,
for each respective finger gesture after the initial finger gesture in the succession of finger gestures:

scrolling information on the display at a respective scrolling speed, wherein the respective scrolling speed is determined in accordance with a respective finger movement speed in the respective finger gesture and a finger movement multiplier;

determining whether the respective finger gesture meets one or more predetermined swipe gesture criteria, the predetermined swipe gesture criteria including a requirement that the speed of the respective finger swipe gesture's finger at lift-off exceeds a predetermined threshold for lift-off speed;

determining whether the respective finger gesture meets one or more predetermined successive gesture criteria, the one or more predetermined successive gesture criteria including that the direction of the respective finger gesture and the direction of a prior finger gesture of the succession of finger gestures meet predefined same linear direction criteria; and in accordance with a determination that the respective finger gesture meets the one or more predetermined swipe gesture criteria and the one or more predetermined successive gesture criteria, updating the finger movement multiplier in accordance with one or more predetermined finger movement multiplier adjustment criteria.

10. The device of claim 9, wherein the same linear direction criteria comprises a requirement that the respective finger gesture and the prior finger gesture are both within a predefined number of degrees of the same axial direction.

11. The device of claim 9, wherein the each finger gesture of the succession of finger gestures comprises a vertically up finger swipe gesture, vertically down finger swipe gesture, horizontally left finger swipe gesture or horizontally right finger swipe gesture.

12. The device of claim 9, wherein the predetermined successive gesture criteria includes a requirement that the number of successive finger swipe gestures exceeds a predetermined threshold.

13. The device of claim 9, wherein the one or more predetermined successive gesture criteria comprise a requirement that a time period between detecting a finger swipe gesture immediately preceding the respective finger swipe gesture and detecting the respective finger swipe gesture be less than a predefined maximum value.

14. The device of claim 9, wherein updating the finger movement multiplier includes gradually increasing the finger movement multiplier during the respective finger gesture.

15. The device of claim 9, wherein the predetermined successive gesture criteria includes a requirement that the speed of a respective finger swipe gesture and the speed of a prior finger swipe gesture of the succession of finger swipe gestures exceed a predetermined threshold for finger swipe speed.

16. A non-transitory computer readable storage medium storing one or more programs, the one or more programs comprising instructions, which when executed by a multifunction device with a display and a touch-sensitive surface, cause the device to:
- detect a succession of finger gestures by a user's finger on the touch-sensitive surface, including an initial finger gesture, wherein each finger gesture of the succession of finger gestures comprises a finger swipe gesture that has a linear direction and ends with a finger lift-off; and,
- for each respective finger gesture after the initial finger gesture in the succession of finger gestures:
  - scroll information on the display at a respective scrolling speed, wherein the respective scrolling speed is determined in accordance with a respective finger movement speed in the respective finger gesture and a finger movement multiplier;
  - determine whether the respective finger gesture meets one or more predetermined swipe gesture criteria, the predetermined swipe gesture criteria including a requirement that the speed of the respective finger swipe gesture's finger at lift-off exceeds a predetermined threshold for lift-off speed;
  - determine whether the respective finger gesture meets one or more criteria including one or more predetermined successive gesture criteria, the one or more predetermined successive gesture criteria including that the direction of the respective finger gesture and the direction of a prior finger gesture of the succession of finger gestures meet predefined same linear direction criteria; and
  - in accordance with a determination that the respective finger gesture meets the one or more predetermined swipe gesture criteria and the one or more predetermined successive gesture criteria, update the finger movement multiplier in accordance with one or more predetermined finger movement multiplier adjustment criteria.

17. The computer readable storage medium of claim 16, wherein the same linear direction criteria comprises a requirement that the respective finger gesture and the prior finger gesture are both within a predefined number of degrees of the same axial direction.

18. The computer readable storage medium of claim 16, wherein the each finger gesture of the succession of finger gestures comprises a vertically up finger swipe gesture, vertically down finger swipe gesture, horizontally left finger swipe gesture or horizontally right finger swipe gesture.

19. The computer readable storage medium of claim 16, wherein the predetermined successive gesture criteria includes a requirement that the number of successive finger swipe gestures exceeds a predetermined threshold.

20. The computer readable storage medium of claim 16, wherein the one or more predetermined successive gesture criteria comprise a requirement that a time period between detecting a finger swipe gesture immediately preceding the respective finger swipe gesture and detecting the respective finger swipe gesture be less than a predefined maximum value.

21. The computer readable storage medium of claim 16, wherein updating the finger movement multiplier includes gradually increasing the finger movement multiplier during the respective finger gesture.

22. The computer readable storage medium of claim 16, wherein the predetermined successive gesture criteria includes a requirement that the speed of a respective finger swipe gesture and the speed of a prior finger swipe gesture of the succession of finger swipe gestures exceed a predetermined threshold for finger swipe speed.

* * * * *